United States Patent
Boatwright et al.

(10) Patent No.: US 7,208,916 B1
(45) Date of Patent: Apr. 24, 2007

(54) BATTERY SYSTEM INCLUDING TWO TEMPERATURE SENSORS

(75) Inventors: Darrell L. Boatwright, Cedar Rapids, IA (US); Ryan R. White, Coralville, IA (US); Rickey G. Austin, Lisbon, IA (US); Kraig D. Brody, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 10/853,018

(22) Filed: May 24, 2004

Related U.S. Application Data

(63) Continuation of application No. 09/945,348, filed on Aug. 31, 2001, now abandoned.

(60) Provisional application No. 60/269,258, filed on Feb. 16, 2001.

(51) Int. Cl.
*H01M 10/46* (2006.01)
(52) U.S. Cl. .................................... 320/150
(58) Field of Classification Search ................ 320/128, 320/132, 137, 150, 153
See application file for complete search history.

(56) References Cited

U.S. PATENT DOCUMENTS 5,652,500 A * 7/1997 Kadouchi et al. ........... 320/150
6,731,096 B1 * 5/2004 Patino et al. ................ 320/150
2001/0011884 A1 * 8/2001 Sakakibara ................. 320/150
2004/0257089 A1 * 12/2004 Aridome .................... 324/430

FOREIGN PATENT DOCUMENTS

JP  11-178231  *  7/1999

* cited by examiner

*Primary Examiner*—Edward H. Tso
(74) *Attorney, Agent, or Firm*—Shook, Hardy & Bacon LLP

(57) ABSTRACT

Numerous features and improvements currently related to a portable computing and data collection system are presented. It will be appreciated, however, that although the features disclosed herein are disclosed in connection with a small, portable hand-held system, these features can also be used singly or in combination with a variety of other computing or battery powered devices. Disclosed features include an improved battery pack containing a unique battery temperature-based sensing system, a modular radio system having an antenna board, a radio frame designed to accept any of a variety of different radio boards, a sealed hand-held personal computing system, a light transmissive window that also serves as a door providing access to the interior of the device, and a unique compact flash card implementation. Embodiments containing various combinations and relations of these features in a portable computing system are also disclosed.

17 Claims, 19 Drawing Sheets

BATTERY SYSTEM INCLUDING TWO TEMPERATURE SENSORS

CROSS REFERENCE TO RELATED APPLICATIONS

This application is a continuation of U.S. application Ser. No. 09/945,348, filed Aug. 31, 2001 now abandoned, which in turn claims the benefit of U.S. Provisional Application No. 60/269,258, filed Feb. 16, 2001. The content of U.S. Provisional Application No. 60/269,258, filed Feb. 16, 2001, including all drawings, written description, claims and appendices, is hereby incorporated herein in its entirety by this reference. In addition, the content of pending U.S. application Ser. No. 09/549,046, filed Apr. 14, 2000, including all drawings, written description, claims and appendices, is hereby incorporated herein in its entirety by this reference.

BACKGROUND OF THE INVENTION

Mobile or portable computers are used to perform a wide variety of tasks. For example, they may be used in connection with the sale, delivery, tracking, distribution, stock control or invoicing of a multitude of various products. Recently, small, portable computers, often called Personal Digital Assistants (PDAs), have become popular. Typically, PDAs have a very lightweight, hand-held form factor and are capable of running applications similar to those commonly used on the more traditional desktop and laptop systems.

PDA-type devices, however, are generally unfit for use in industrial environments. They are not suited, for example, for product-related applications such as the sales, delivery, tracking, distribution, stock control and invoicing applications listed above. Current PDAs lack the durability, memory capacity, communication capabilities, power, modularity and diversity required for such applications and environments.

Consequently, there exists a need for an improved handheld, portable computing, data collection and communication device suitable for a variety of work environments and product-related handling. More particularly, there exists a need for improved features related to wireless communication capabilities, battery packs, computer program and data storage systems and space saving features. These needs are addressed and fulfilled by the present invention as disclosed in the detailed description provided below. Further, it will be appreciated that many of the improved features described below have utility beyond the lightweight, handheld, portable device for which they were originally developed.

SUMMARY OF THE INVENTION

The following disclosure presents numerous features and improvements currently related, in a present commercial embodiment, to a portable computing and data collection system. It will be appreciated, however, that although the features disclosed herein are disclosed in connection with a small, portable hand-held system, these features can also be used singly or in combination with a variety of other computing or battery powered devices. Accordingly, the features presented herein are not intended to be limited to embodiments involving a portable computing device, handheld computing device or PDA-style device.

Disclosed features include, for example, an improved battery pack containing a unique battery sensing system, a modular radio system having an antenna board, a radio frame designed to accept any of a variety of different radio boards, a sealed hand-held personal computing system, a light transmissive window that also serves as a door providing access to the interior of the device, and a unique compact flash card implementation. Embodiments containing various combinations and relations of these features in a portable computing system are also disclosed. Other aspects will become apparent upon review of the drawings, detailed description and claims.

BRIEF DESCRIPTION OF THE DRAWINGS

The invention may be more fully understood by reading the following description of the invention, in conjunction with the appended drawings, wherein.

DETAILED DESCRIPTION

FIGS. 1 through 6 depict various views of an embodiment of a portable computer. It will be appreciated that other embodiments of the invention can include various subsets of the features disclosed via FIGS. 1 through 6. It will also be appreciated that various features disclosed herein can be used in a wide variety of apparatus and should therefore not be limited to the embodiment depicted in FIGS. 1 through 6.

Figure 1:
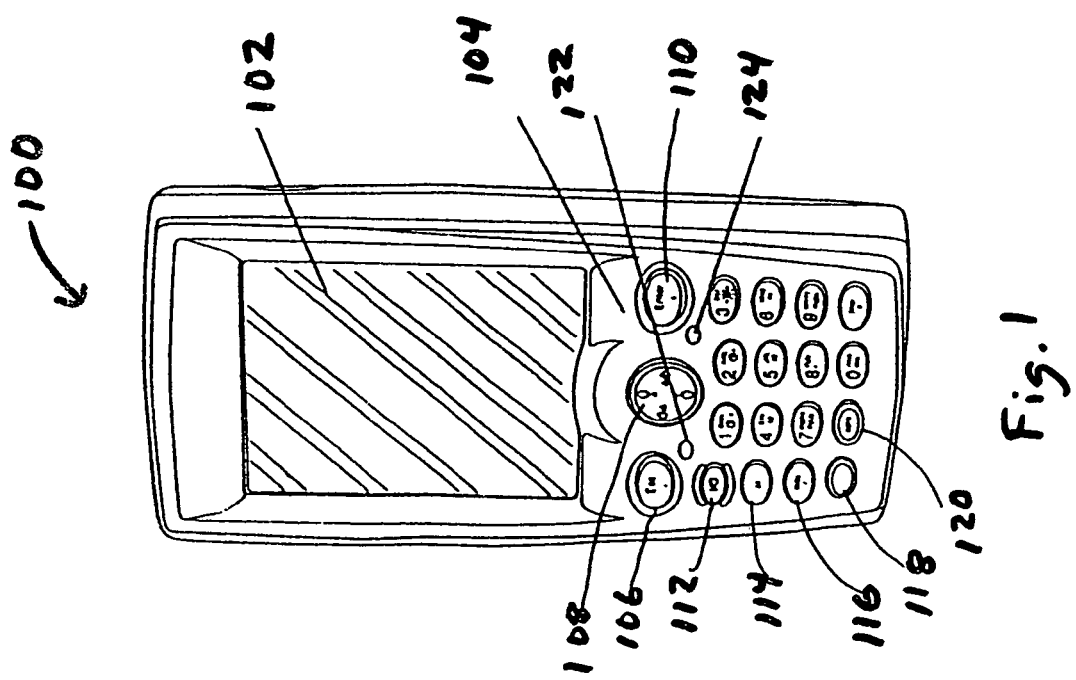
FIG. 1 depicts a front view of a portable computer.

FIG. 1 depicts a front view of a hand-held portable unit 100. The unit 100 includes a display area 102. The display area 102 can include, for example, a touch screen or a digitizer screen and it can be protected by a magnesium frame. The unit 100 also includes a keypad area 104 that can include a numeric or alphanumeric-style (depicted) key area, an escape "Esc" key 106, a four-way navigation key 108, an "Enter" key 110, a power up/down key 112, an "A1" key 114, a "BackSpace" key 116, a "Gold" key 118, and an "Alpha Shift" key 120. The keypad 104 can include a telephone style layout as depicted. In addition, the keys can be programmable.

The functions of many of the keys are self-explanatory. The four-way navigation key 108 is used to maneuver a cursor or other type of selection indicator about the display screen 102. The "A1" key 114 is an application 1 key that can be used to launch a software or user specified application program with a touch of a button. The "Gold" key 118 can be used to activate keypad keys to control screen contrast, screen backlighting, generate special characters, or start various applications (such as Pocket PC applications). The unit can run the Pocket PC operating system, but it will be appreciated that other operating systems, such as DOS, Windows95, WindowsCE or the like, can alternatively be used. The "Alpha Shift" key 120 can be depressed to enable input of alphabetic characters via various keys of a unit having an alphanumeric-style key area.

Also located within the keypad area 104 are two visual indicator lights. One light can function as a "Laser On" and "Good Scan" indicator 122 for a unit 100 equipped with a laser scanner or other type of optical reader. The other light can serve as a "Charge" and "Battery Status" indicator 124.

In one embodiment, the unit 100 has a pocket-size form factor, weighs approximately 16 ounces and has dimensions of 7¼"(L)×3½"(W)×1½"(D). In addition, the unit 100 can operate within a temperature range of −20 to +60 degrees Celsius. It is designed to withstand a four foot drop to concrete and meets IP54 sealing requirements for rain and dust.

Figure 2:
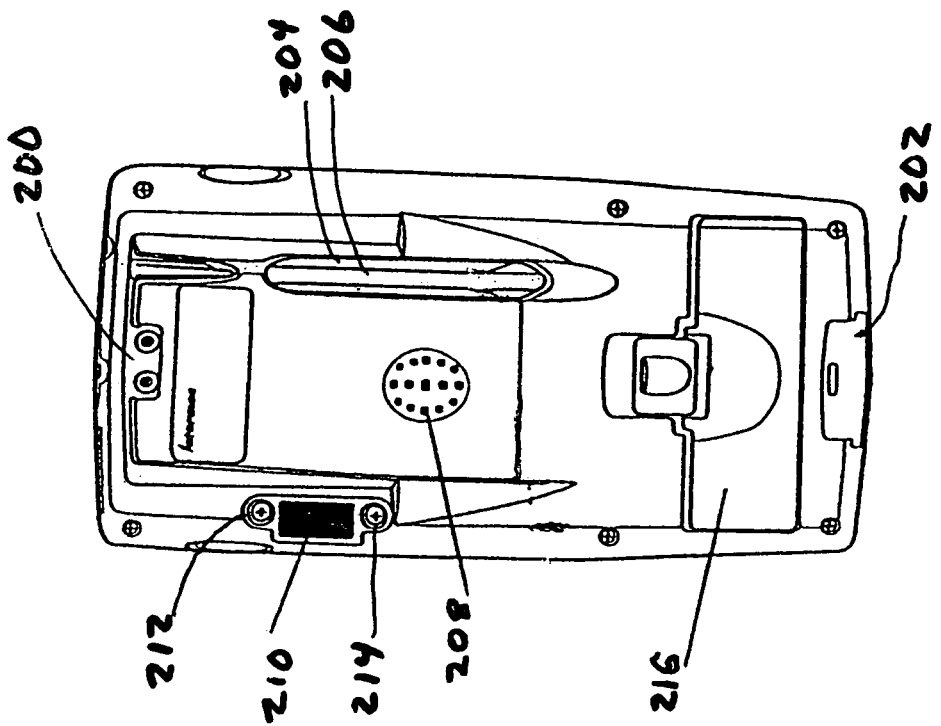
FIG. 2 depicts aback view of the portable computer of FIG. 1.

FIG. 2 depicts a back view of the unit 100. The unit 100 can include handstrap attachments 200, 202 for attaching a user replaceable, stretchable hand strap (not shown) to the unit 100. Further, a recess is included to serve as stylus holder 204 for a stylus 206. The stylus 206 can be a device suitable for use with a unit including a touch or digitizer screen. In addition, a speaker 208 is located in the handgrip area of the unit 100. The speaker 208 can be, for example, a full-range WAV file compatible speaker or any other suitable speaker.

Also depicted is a removable lens 210 for facilitating communication with the unit 100. For example, the unit 100 can include an infrared communication component communicating pursuant to an IrDA (Infrared Data Association) standard. The removable lens 210 is designed to permit passage of electromagnetic radiation of the desired wavelength(s).

The removability of the lens 210 is a unique and useful feature. As a result of the small size of devices such as PDAs, or the unit 100 of FIGS. 1 through 6, space on the housing for features such as doors is very limited. Further, when designing a unit to be sealed against moisture and/or airborne particles, it is desirable to minimize the number of windows or access doors on the housing. The combination of a window and an access door in a single structure, such as is provided by the removable lens 210, reduces the number of housing features that must be reliably sealed to protect the unit from environmental damage.

In one embodiment, the removable lens 210 can be removed by a user to access a user-replaceable card located within the housing of the unit 100. In the embodiment of FIG. 2, the removable lens 210 is removed by loosening the two screws 212, 214. Other types of user-manipulated structures can alternatively be used to permit ready removal and attachment of the removable lens 210.

By way of example, the unit 100 can contain a GSM (Global System for Mobile communications) radio. GSM is a digital cellular mobile telephone system available in various regions of the world. GSM systems use a Subscriber Identity Module (SIM card, a type of smart card, to identify a GSM subscriber. The SIM card is a removable card that can hold the identity number and authentication key, as well as other information, related to a subscriber. Accordingly, in one embodiment, the removable lens 210 is positioned on the housing so as to enable a user to remove the lens 210 and then insert or remove a SIM card. In other related embodiments, the removable lens 210 can facilitate access to another type of smart card, memory card or other card.

FIG. 2 also depicts a battery compartment 214 capable of receiving a rechargeable battery. The battery compartment is sealed and it contains electrical contacts for electrically coupling with a battery. The battery compartment 214 also contains a reset switch that can be depressed to reboot the system after a malfunction.

In one embodiment, the rechargeable battery is a user-replaceable, rechargeable 2000 mAh lithium-ion battery pack. (It will be appreciated, however, that batteries of various chemistry and capacity can be used with the system. The choice being a function of design choice.) Depending on the application(s) being run, such a battery pack can sustain eight to ten hours of operation. Further, the unit can contain a capacitor back-up. Upon removal of the battery pack, the capacitor back-up can maintain the RAM contents for two to three minutes. As a result, a battery pack can be replaced without having to shut down the unit 100. Further, this permits removal of a battery to depress the reset switch. Inclusion of the capacitor back-up enables a graceful power down to the Suspend state. The capacitor back-up can also maintain the unit in suspend state. Further details related to the battery pack are disclosed below (see FIG. 20 for example).

Figure 3:
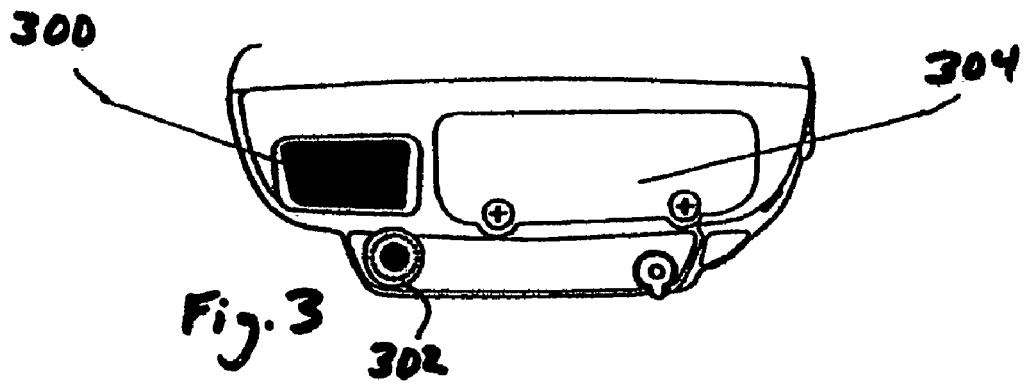
FIG. 3 depicts a top end view of the portable computer of FIG. 1.

FIG. 3 depicts a top end view of the portable computer of FIG. 1. The top end includes a reader window 300 for an optional optical reader. A unit 100 containing an optical reader can include a one-dimensional (1D) or a two-dimensional (2D) style reader. For example, the integrated optical reader can be a laser scanner capable of reading linear codes and/or 2D codes (such as PDF417 codes). Next to the reader window 300 is a connector for an optional wireless WAN antenna 302. As disclosed below, the unit can include any of a variety of different radio modules.

An access door 304 is also on the top end. This door, like the other features on the top end, is sealed against rain and dust. The access door 304 permits replacement of a card, a CompactFlash card for example. A unique CompactFlash card implementation is disclosed below in relation to FIG. 21.

Figure 4:
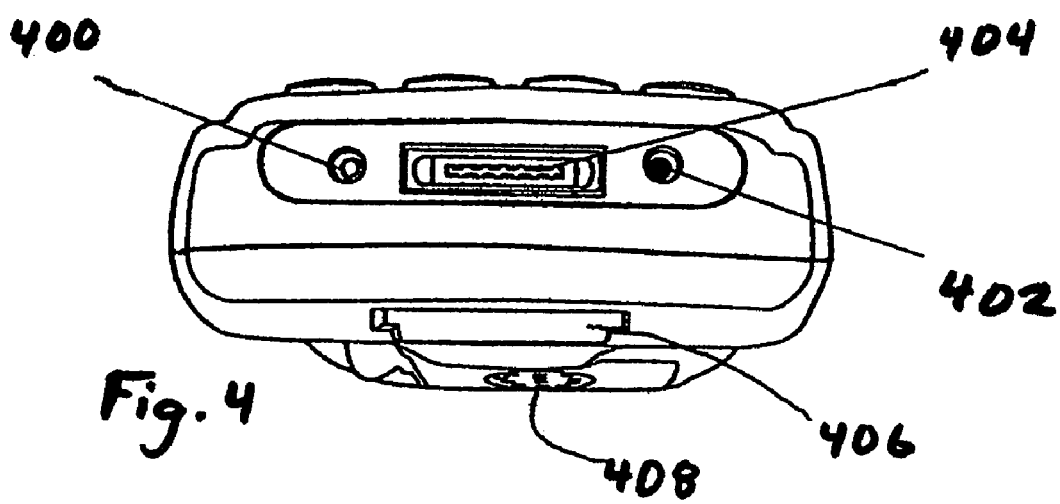
FIG. 4 depicts a bottom end view of the portable computer of FIG. 1.

FIG. 4 depicts a bottom end view of the portable computer of FIG. 1. Three different connectors can be located on the bottom end. A charge input 400 is depicted on the left side of FIG. 4. This input 400 can receive an AC adapter or an auto-style adapter for example.

An audio jack 402 is depicted on the right-hand portion of the bottom end. The audio jack 402 can be coupled with a microphone or an earpiece. It can be designed, if desired, to meet the industry standard for mobile phones.

The centrally located docking connector 404 can perform a variety of functions. For example, it can serve as a serial port, an Ethernet port and a charge input. It can also provide power to a device tethered to the portable computer (such as an optical reader or other accessory device for example).

Also depicted in FIG. 4 is one of the handstrap connectors 406 (see also 200, FIG. 2) and a speaker 408 (see also 208, FIG. 2).

Figure 5:
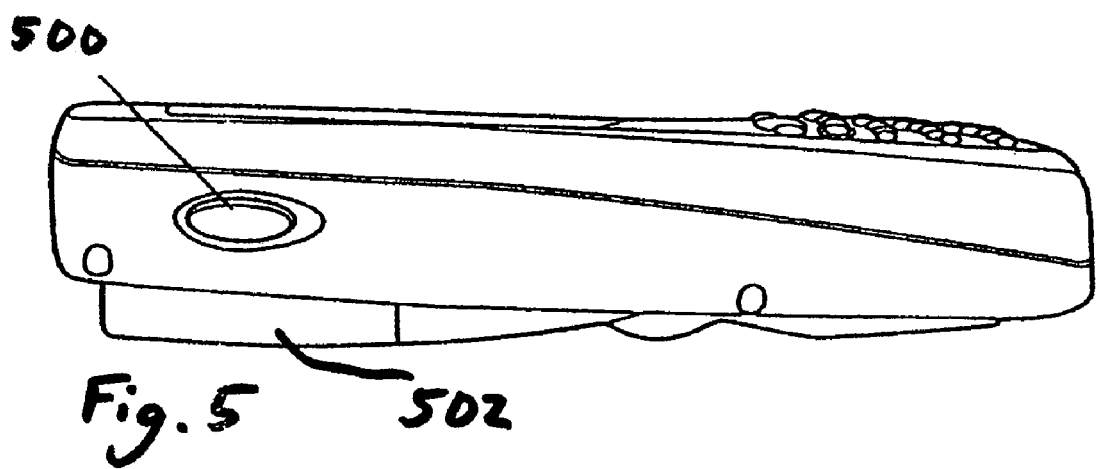
FIG. 5 depicts a side view of the portable computer of FIG. 1.

FIG. 5 depicts a side view of the portable computer of FIG. 1. One or both of the side surfaces can include a reader trigger 500 for activating an optical reader. Inclusion of a reader trigger 500 on both the left and right sides of the unit 100 enables the optical reading unit to be conveniently used by both right and left handed users. The location of the radio pod 502 is also depicted in FIG. 5. As disclosed below, this pod 502 can house an internal antenna. In an alternative embodiment, this pod 502 houses a Blue Tooth radio module. As disclosed herein (see FIGS. 7–17 for example), several different types of radios can be readily integrated into the unit 100.

Figure 6:
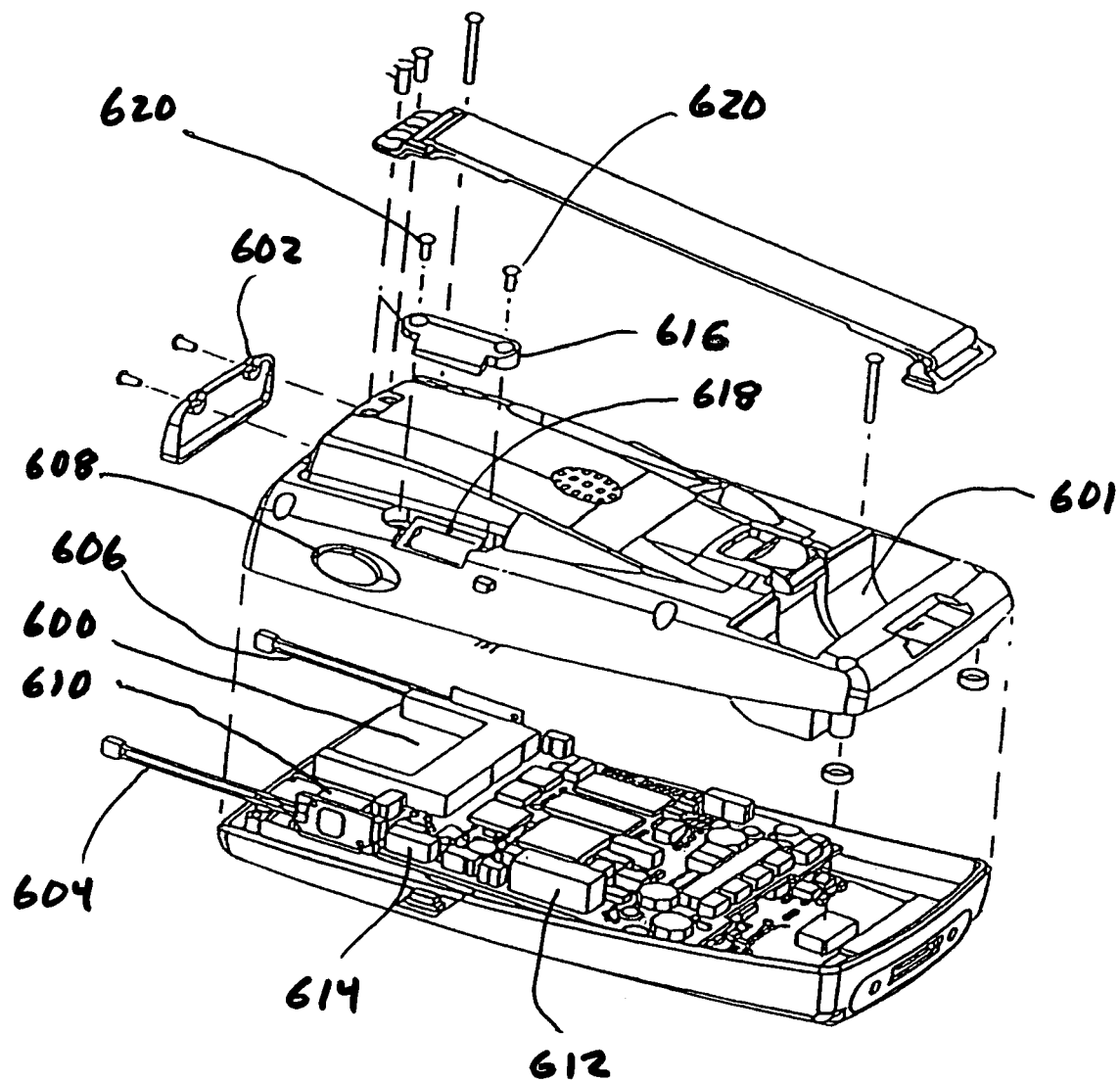
FIG. 6 is an exploded, elevated side view depicting interior and other features of an embodiment of the portable computer of FIG. 1.

FIG. 6 is an exploded, elevated side view depicting interior and other features of an embodiment of the portable computer of FIG. 1. A connector 600 for receiving a memory module or card, such as a CompactFlash or SanDisk for example, is depicted with a removable access panel 602. The battery compartment 601 is empty in this illustration. The two optical reader trigger cables signal the board when one of the trigger buttons 608 has been depressed. The optical reader module 610 is depicted next to the memory card connector 600.

The unit also includes the capacitor back-up 612 and IrDA transceiver 614. The transceiver 614 is positioned next to the removable light transmissive window 616. The housing has a flat angled surface 618 around the port to the transceiver 614 so that a gasket can be positioned between the port and the removable window 616 to seal the unit. Two screws 620 are used to attach and detach the window to the housing.

Figure 7:
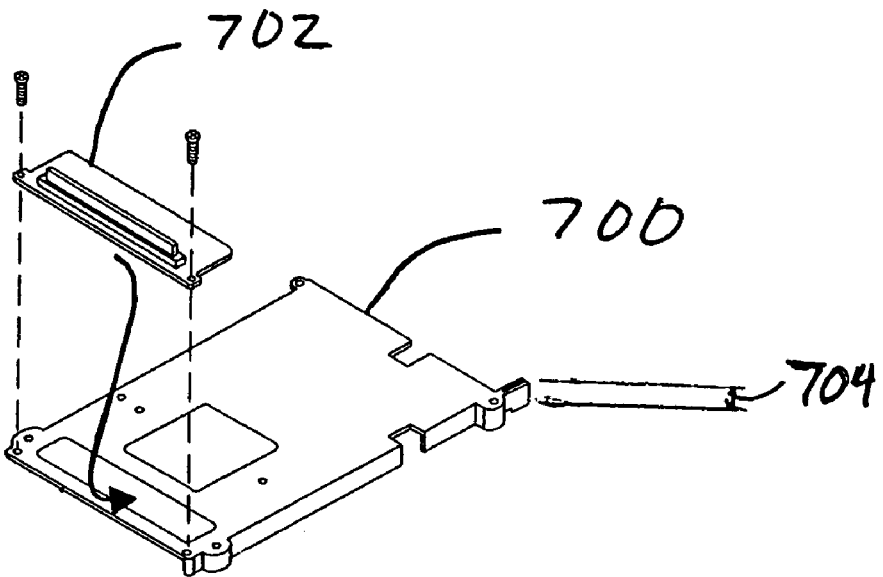
FIGS. 7–9 depict a frame system for coupling a module to a computerized system.

FIGS. 7 through 17 depict a frame system that uses a single frame for coupling any of several different cards or modules with a computerized device. FIG. 7 depicts the frame 700 that can be used throughout the various examples. The dimensions of the frame in one embodiment are 2.65 inches wide by 3.4 inches long and it has a depth 704 of 0.3 inches. The dimensions of the frame can be altered to meet the demands of the application at hand.

Figure 8:
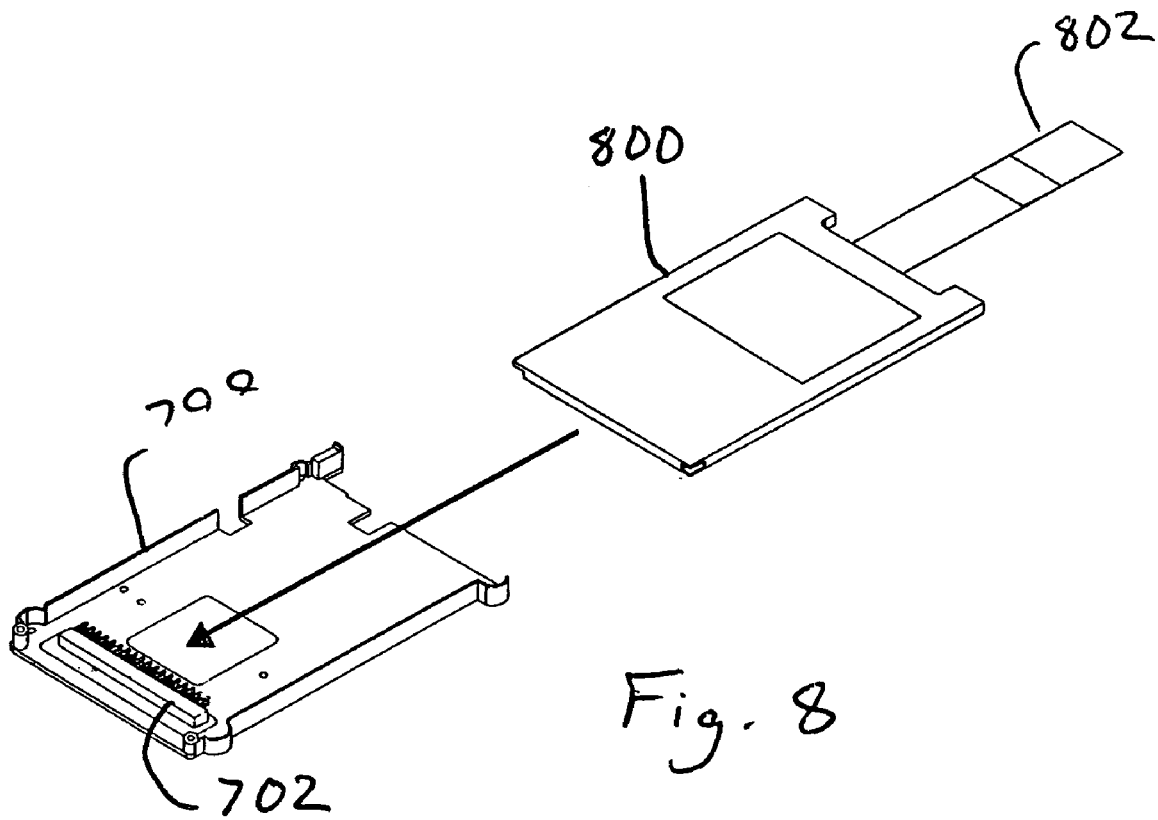
Figure 9:
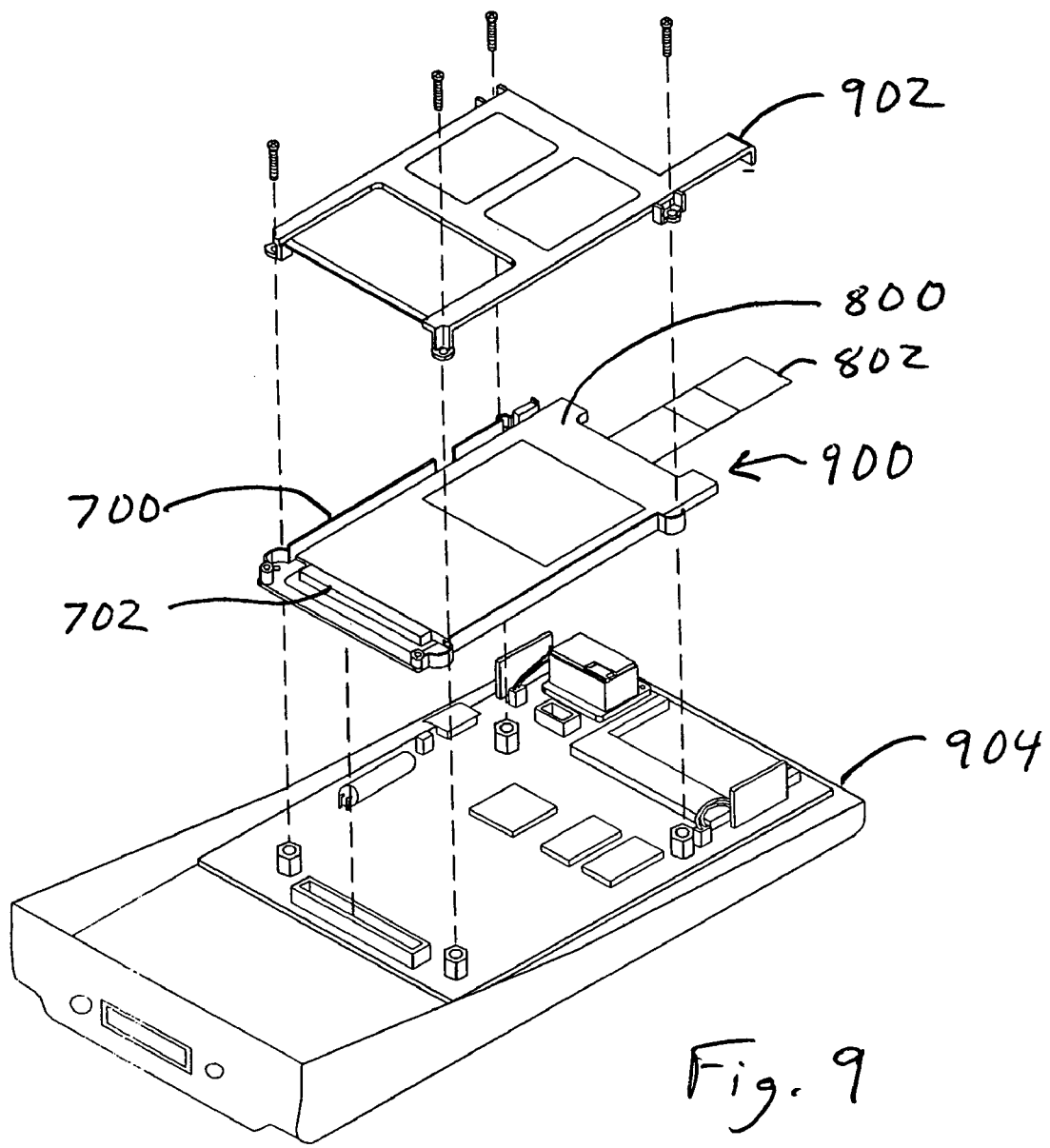

FIGS. 7 through 9 depict the use of the frame 700 for coupling a PCMCIA format radio to the unit. The frame can be made, for example, from magnesium or from another appropriate material. The PCMCIA compatible connector 702, however, can receive many different types of Type II and Type III card or modules. Thus, in other embodiments, the frame can receive a module that is not a radio module.

FIG. 8 depicts the assembled frame 700 and connector 702 receiving a PCMCIA card 800. The card 800 has a tape 802 attached. If desired, the tape can be included to secure objects such as cables that run to or near the card 800. In one embodiment the card 800 is a radio card. The radio card can be a LAN radio. In one embodiment, the card is a Lucent PCMCIA Type II LAN radio operating pursuant to the 802.11 standard at a frequency of 2.4 GHz. Many other types of radios can alternatively be used.

FIG. 9 depicts the card and frame assembly of FIG. 8 900 being secured via a retainer component 902 to an electronic component 904 (for example to the interior of a portable data collection device).

Figure 10:
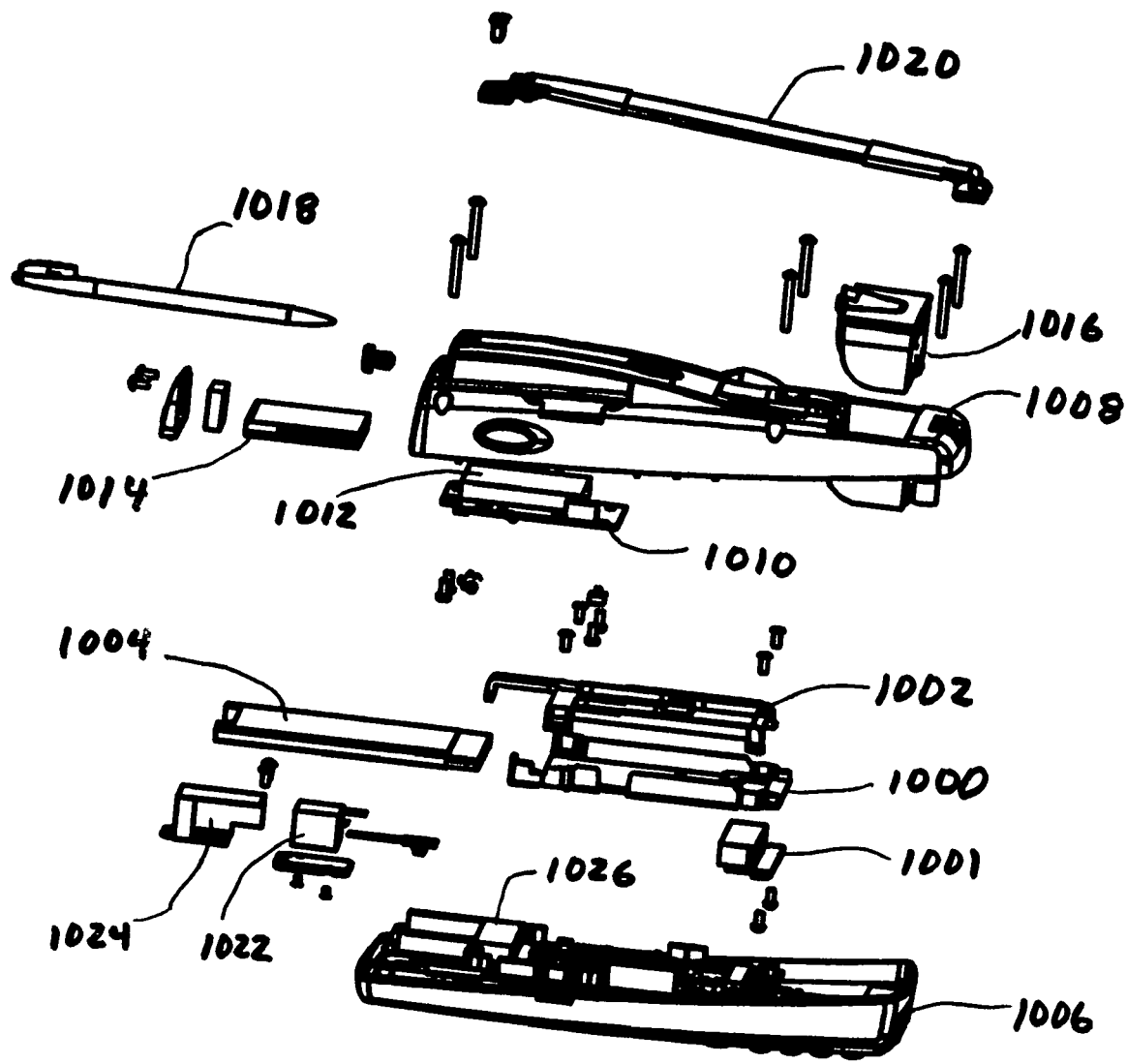
FIG. 10 depicts the frame system of FIGS. 7–9 in conjunction with a portable data collection device.

FIG. 10 depicts an exploded view of a portable data collection unit including the assembly of FIGS. 7 through 9. The frame 1000, connector 1001, retainer 1002 and card or module 1004 are depicted relative to the upper shell 1006 of the unit. A radio board 1010 and an antenna 1012 are depicted proximate the unit's lower shell 1008. When the antenna 1012 is not required, a Blue Tooth radio can be coupled at the same location 1012. Such a configuration can support two different radios simultaneously. For example, a Blue Tooth radio and a WAN radio can be included and used together in the same unit. The memory module 1014, battery pack 1016, stylus 1018 and handstrap 1020 are also depicted near the lower shell 1008.

Two optical readers 1022, 1024 (only one of which is installed at any one time) are depicted near the memory module connector 1026. The optical readers have different characteristics. More than two optical reader alternatives can also be provided. The appropriate reader, for example a 1D or 2D laser scanner, will be installed to meet the needs of the application at hand.

Figure 11:
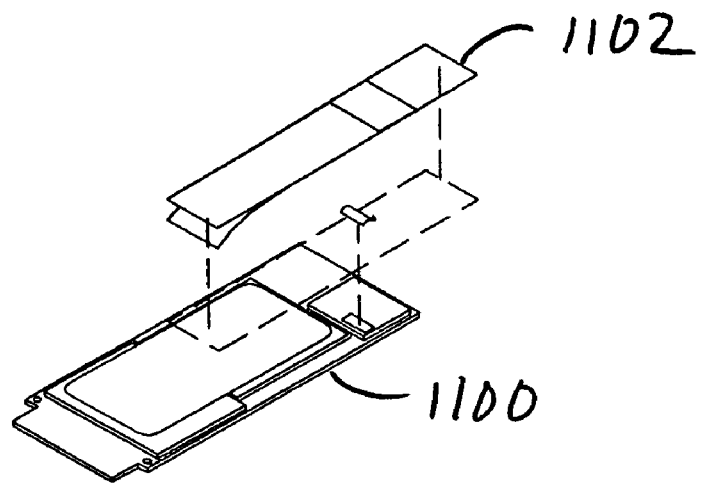
FIGS. 11–16 depict the frame of FIGS. 7–10 being used with a different type of module.

FIGS. 11 through 17 depict the use of the same frame 700 of FIG. 7 in conjunction with a different card or module. FIG. 11 depicts a non-PCMCIA card 1100. For example, the card 1100 can be a serial interface module. The module or card 1100 can be a radio, for example a LAN or a WAN radio, in one embodiment, or a non-radio card (such as a memory, modem, etc. card) in another embodiment. If desired, a tape 1102 can be attached to the card 1100 to help secure cables running to or near the module or card 1100.

Several additional different types of radio cards or modules can be coupled with the unit via the frame system of FIGS. 11 through 17. For example, the card 1100 can be a serial interface radio. By way of further example, the card 1100 can be a Model 802 or Model 902 WAN radio by RIM. Additionally, the card 1100 can be a Global System for Mobile Communication (GSM) or a CDPD protocol radio. As noted above, housing a Blue Tooth radio in the radio/antenna pod (see 502, FIG. 5) creates a dual radio unit. For example, a unit running both a WAN and a Blue Tooth radio.

Figure 12:
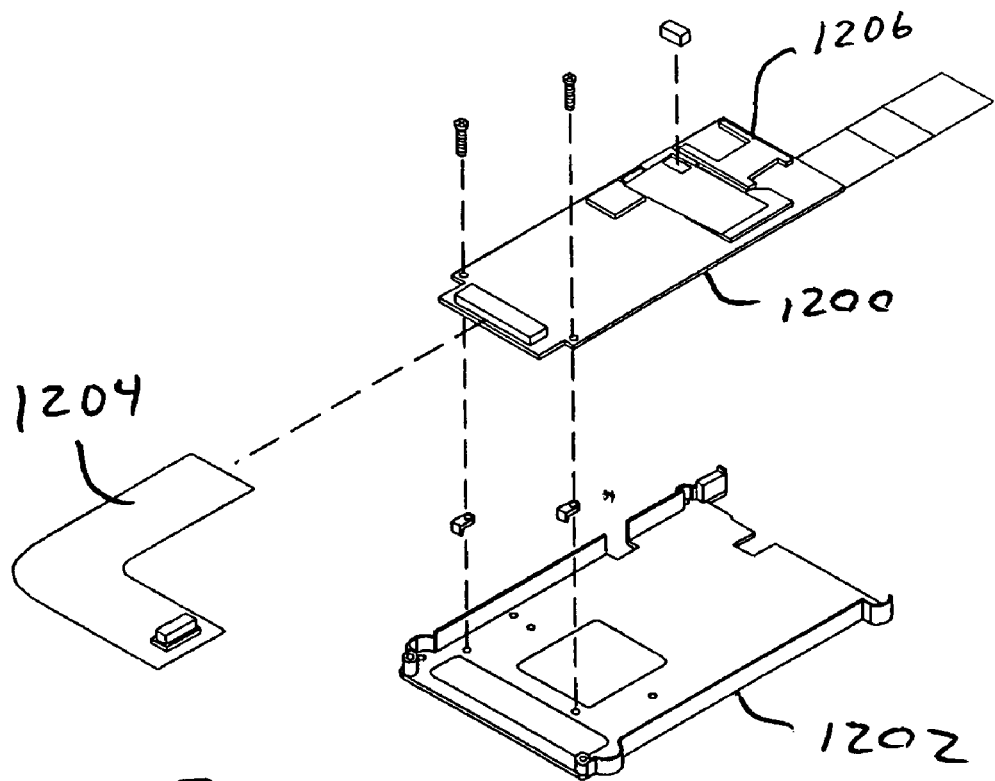

FIG. 12 depicts the module or card of FIGS. 11 1100 with the frame 1202 and a flex cable 1204. The flex cable 1204 carries the communication signals from the card to the rest of the unit. An additional card connector 1206 is located on the card 1200. This connector 1206 can receive a card adding extra memory to be used by the card 1200. For example, when the card 1200 is a GSM radio, the connector 1206 is a SIM card connector. If desired, the removable light transmissive window can be positioned on the housing to permit access to the connector 1216 and to permit a light energy transceiver, such as an IrDA transceiver, to communicate therethrough.

Figure 13:
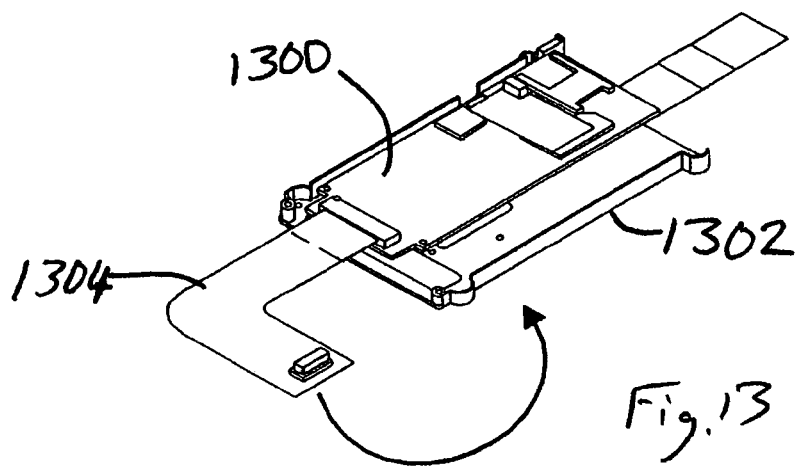
Figure 14:
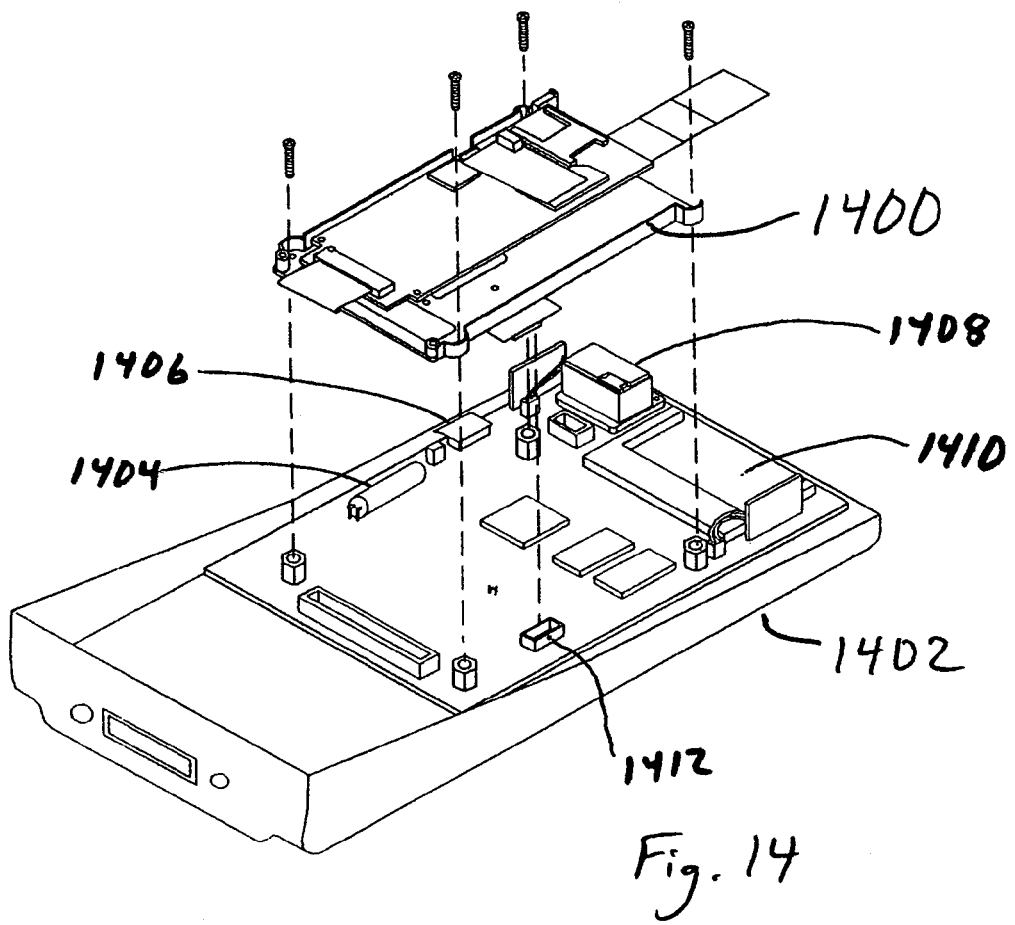

FIG. 13 depicts the module 1300 connected to the frame 1302. The flex cable 1304 is then bent under the frame so that it can be coupled with a connector of a computerized device. FIG. 14 depicts the assembly 1400 of FIG. 13 being connected with a computerized device 1402, for example a portable data collection terminal. A super capacitor 1404, IrDA transceiver 1406, optical reader module 1408, flash connector 1410 and flex cable connector 1412 are all depicted in FIG. 14. There is no requirement that all, or even any of these components 1404, 1406, 1408 or 1410 be included in the various embodiments described throughout this disclosure. Rather, various combinations of such components can be included as necessary to meet the demands of the application at hand.

Figure 15:
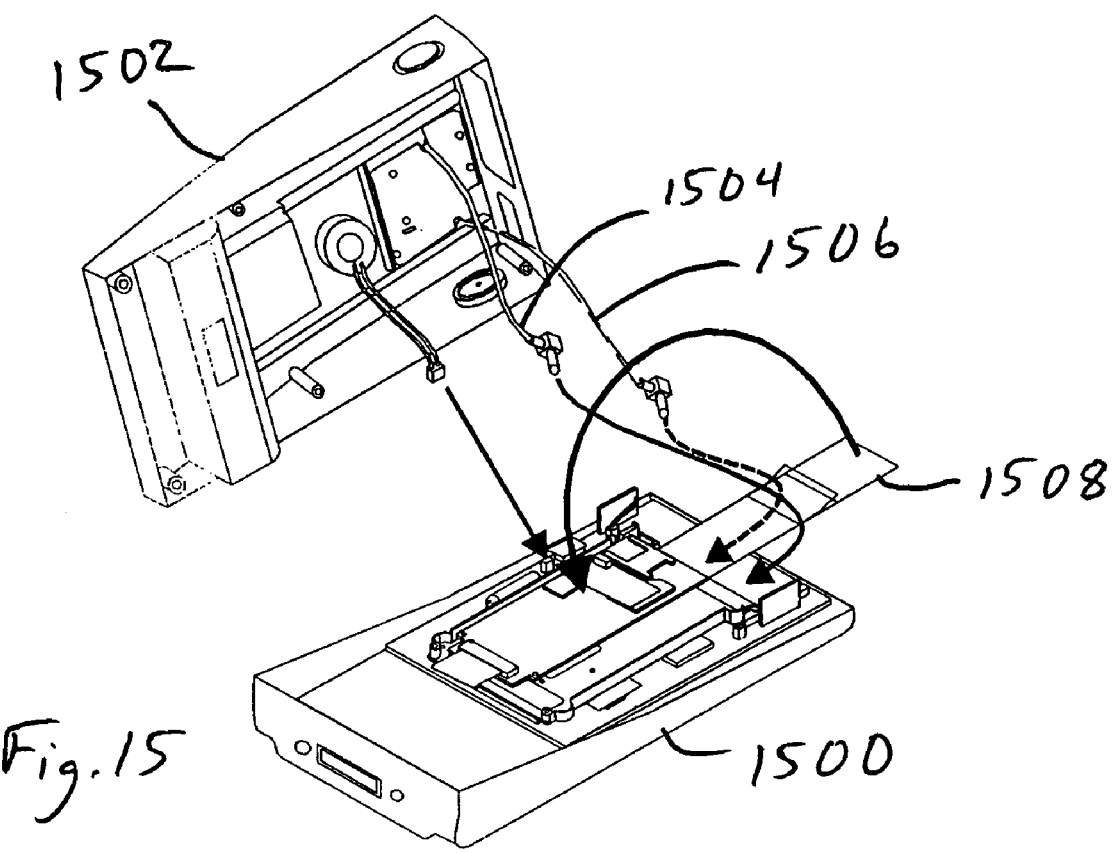
Figure 16:
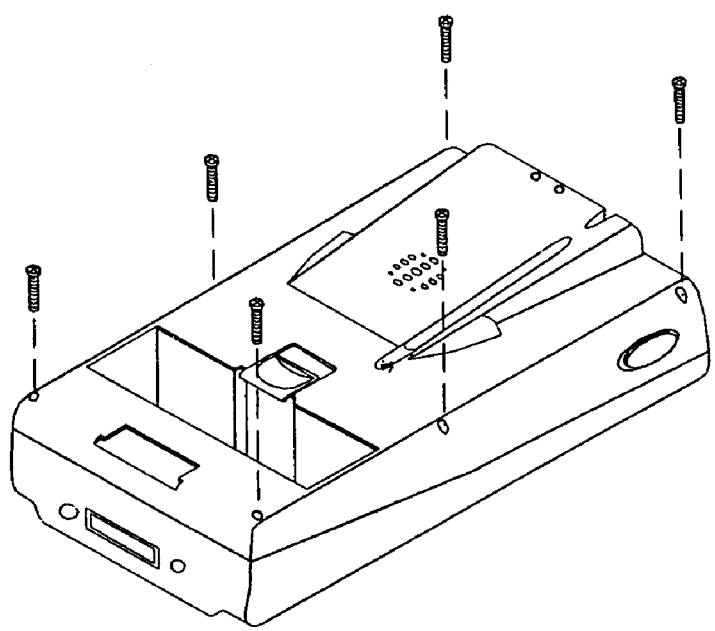

FIG. 15 depicts the assembly of FIG. 14 being connected to the upper 1500 and lower 1502 shells of a portable unit. Antenna cables from the radio pod area of the lower shell 1502 are coupled with the radio. If desired, tape 1508 can be used to fasten the various cables in place. FIG. 16 depicts the completed unit.

Figure 17:
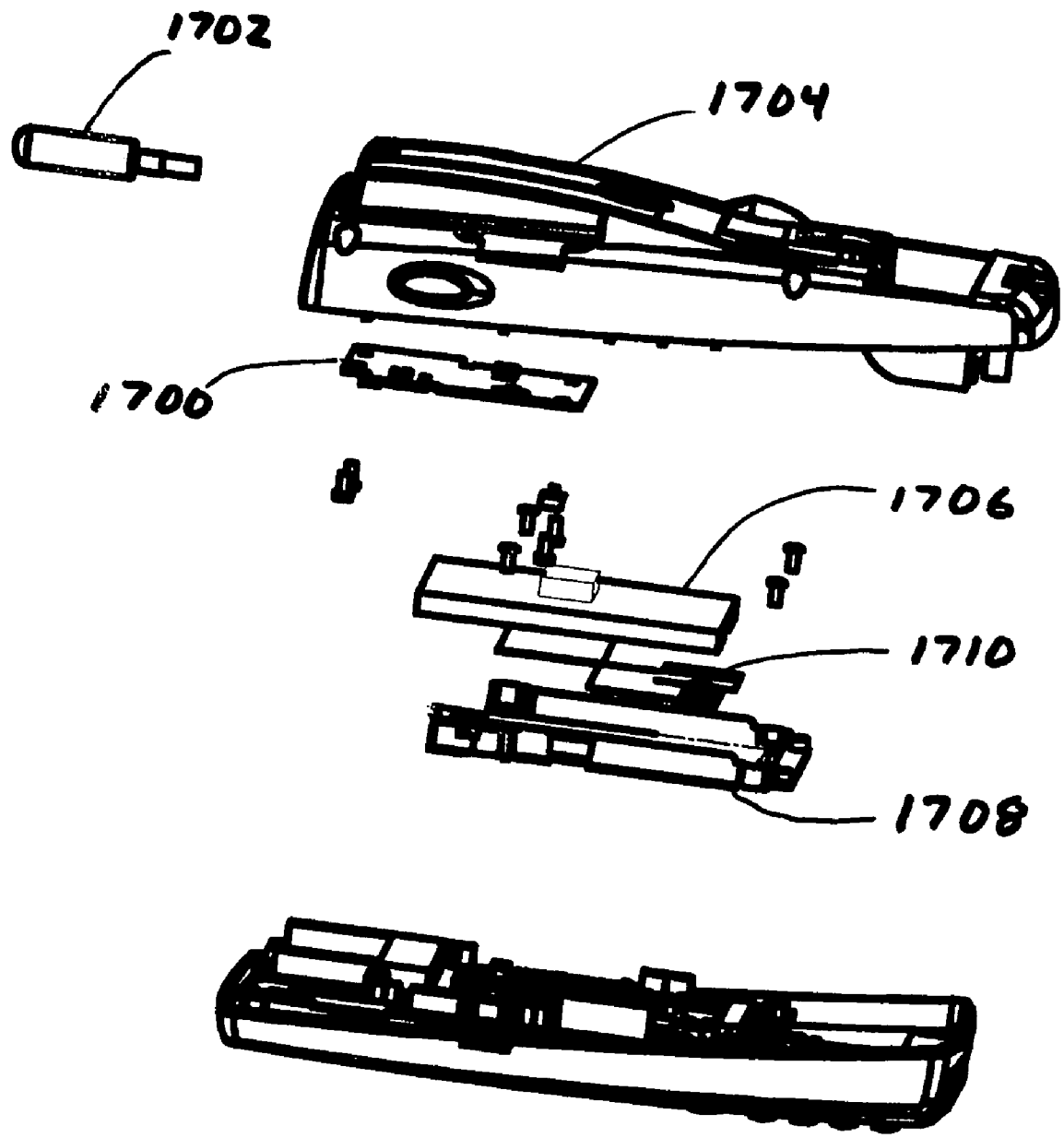
FIG. 17 depicts the frame system of FIGS. 11–16 in conjunction with a portable data collection device.

FIG. 17 is an exploded view of an embodiment of a portable data collection terminal housing the assembly of FIGS. 11–16. A radio board 1700 and external antenna 1702 are depicted next to the lower shell 1704 of the terminal. If desired, a Blue Tooth radio can be mounted on the side of the radio board 1700 that is opposite the card 1706. The Blue Tooth Radio would be positioned within the radio/antenna pod area as described above. The frame 1708 and flex cable 1710 are located near the card or module 1706.

Figure 18:
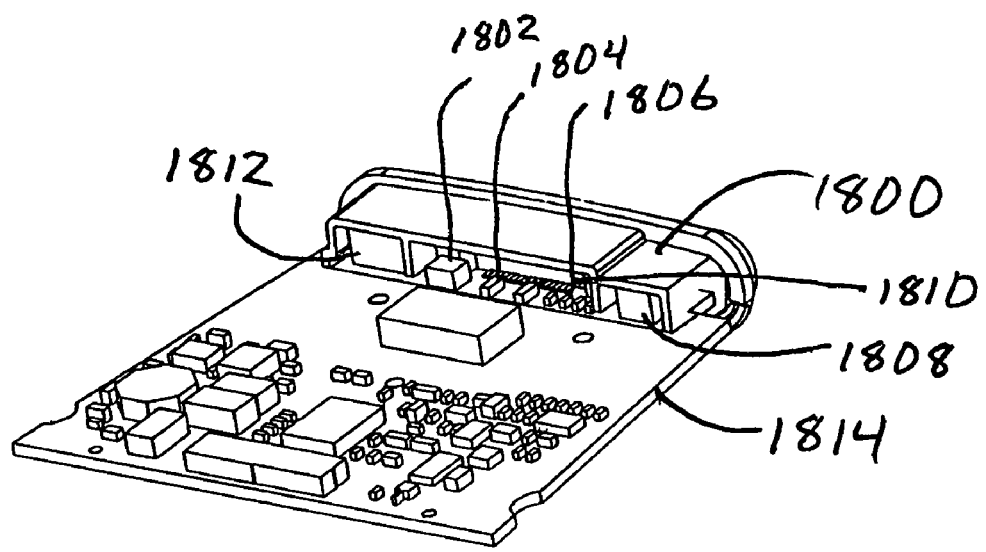
FIGS. 18 and 19 depict a sealing system for use with an originally unsealed component.
Figure 19:
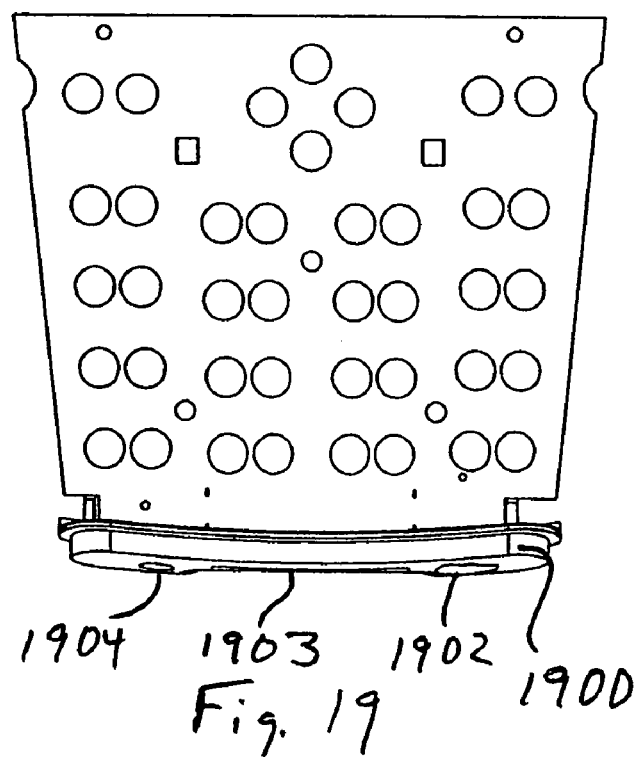

FIG. 18 depicts an end of a terminal unit containing a connector assembly. The connector assembly can be similar to that discussed above in relation to FIG. 4 for example. FIG. 19 depicts the underside of assembly of FIG. 18. FIG. 19 also depicts the keyboard side of the board. FIG. 18 includes a standard connector component 1800, 1900 that is not a sealed unit when it is originally manufactured. It has been found, however, that the component 1800, 1900 can be sealed during assembly of the terminal.

First, the connector 1800, 1900 is fit over the electronic board 1814. The assembly creates three cavities 1808, 1810, 1812 within which are some board 1814 mounted electrical components 1802, 1804, 1806. A silicone sealant can be used to fill and seal the cavities. A Room Temperature Vulcanized (RTV) silicone, for example, can be used as the silicone sealant. By way of further example, the sealant can be an RTV3140 silicone sealant.

It is important that the sealant does not run out of the external holes 1902, 1903, 1904 (400, 402, 404 of FIG. 4) and onto the exterior of the housing. This could degrade the appearance of the terminal housing and it could interfere with the functioning of the external connectors. Also, care must be taken that bubbles and voids are not created within the cavity regions 1808, 1810, 1812 as this could jeopardize the seal. Consequently, a tape, paper or other such material is placed along the back wall of the connector 1800, 1900 proximate the external holes 1902, 1904 (400, 402, 404 of FIG. 4) before the sealant is applied. The sealant is then placed in the cavities and allowed to cure. Thus, a connector that is not specifically designed to be sealed can be sealed and used in a device such as a portable data terminal.

Figure 20:
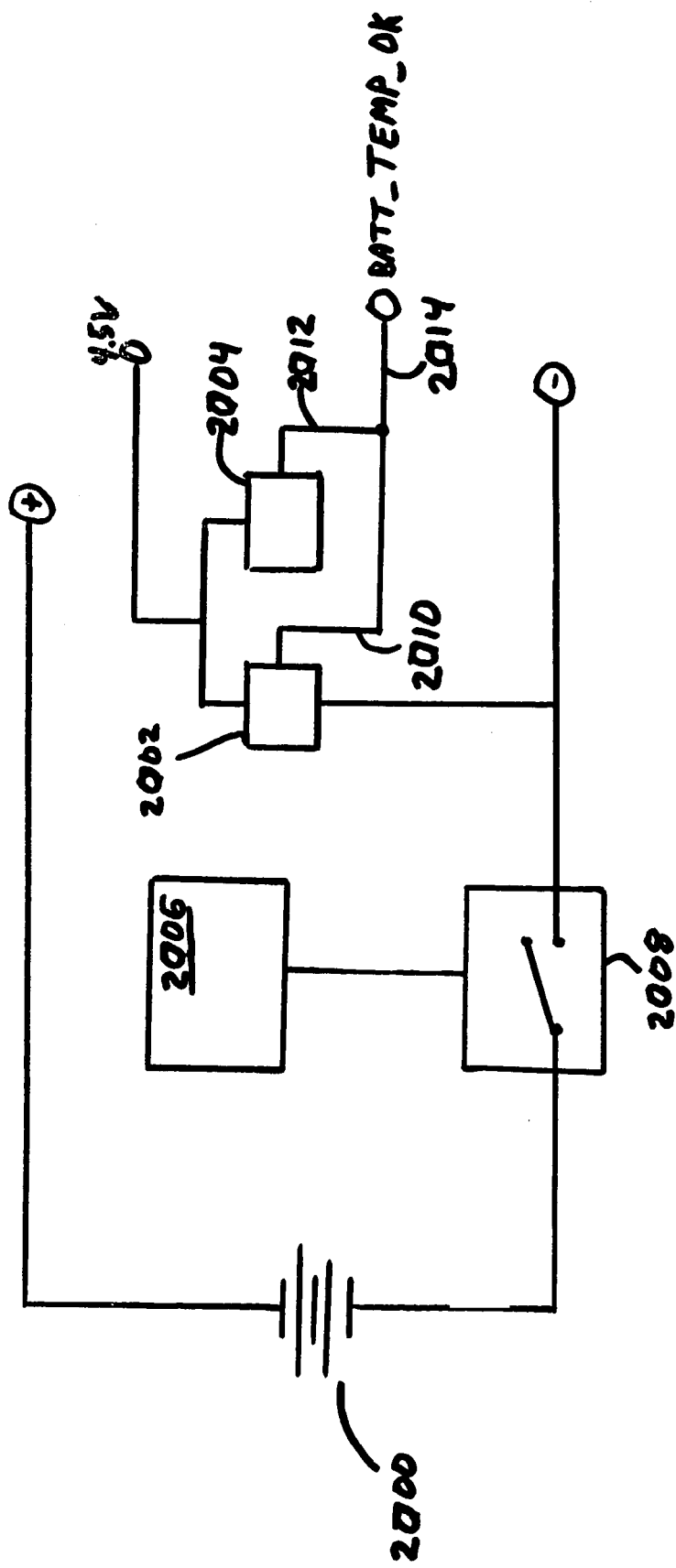
FIG. 20 is a schematic diagram depicting a battery pack system.

FIG. 20 is a schematic diagram depicting a battery pack system such as may be used with the embodiment of FIGS. 1–6, with other types of computerized devices, or with a wide-variety of other types of battery-powered devices. Portable, battery-powered devices may be called upon in a variety of different environmental conditions. These conditions can be encountered in a wide variety of ways. For example, a battery-powered device may be in a locale having an unusually warm or cool climate. The devices may be outdoors in winter or summer seasons. They may be used in a walk-in freezer or refrigeration unit. They may be used in a hot manufacturing or other warm work environment. Many other types of environments can also be encountered.

Various temperature levels can affect battery efficiency. Generally, battery efficiency and life is improved if operation and battery charging is confined to an appropriate temperature range. FIG. 20 depicts features of an inexpensive battery pack based system for sensing and communicating whether battery temperature is within a desired temperature range. The system accomplishes these objectives without a battery pack based processor such as is used in more expensive "smart pack" systems.

As depicted in FIG. 20, the system includes one or more battery cells 2000, a first temperature sensor 2002 and a second temperature sensor 2004. In one embodiment, the system also includes a battery protection component 2006 coupled with a switch 2008. The battery protection component 2006 can monitor the battery cell(s) 2000 and open switch 2008 if it determines that the battery pack is about to be over-charged or over-discharged. The battery protection component 2006 and the switch 2008, however, are optional components of the battery pack based system. Other embodiments need not include these features.

The temperature sensors 2002, 2004 can receive operating power from the battery cell(s) 2000 by being coupled directly thereto or by being coupled indirectly via the switch 2008 (as depicted). If the battery should become over discharged, however, the temperature sensors may not be able to send out the charge signal. Alternatively, the temperature sensors can receive power from a source external to the battery pack, such as a coupled device or a charging dock.

The temperature sensors 2002, 2004 can each be, for example, a temperature sensitive diode. A thermistor is another example of a type of component that can be used as a temperature sensor 2002, 2004. Other types of components can alternatively be used for one or both of the temperature sensors 2002, 2004.

One of the temperature sensors 2002 or 2004 is selected for its ability to distinguish whether the lower limit of the desired temperature range has been violated. The other temperature sensor 2002 or 2004 is selected for its ability to distinguish whether the upper limit of the desired temperature range has been violated. Each temperature sensor 2002, 2004 places a signal on its respective output line 2010, 2012 to indicate whether its limit has been violated. Alternatively, a single component may be used that contains both the low and high temperature limit detectors. Such a device, for example, is a MAX 6507 by Maxim.

It is best to charge certain types of battery cell(s) 2000, such as LiIon, Lithium Polymer, Nickel Metal Hydride (Ni-MHD) and Nickel Cadmium (NiCD) battery cells for example, when the temperature of the battery pack is between 0 degrees and 50 degrees Celsius. Further, warmer temperatures will enable a battery to run longer before requiring recharging. In such a case, the first temperature sensor 2002 can be one that outputs a signal on its output line 2010 when a temperature lower than 0 degrees Celsius is sensed. The other temperature sensor 2004 can be one that outputs a signal on its output line 712 when it senses a temperature higher than 50 degrees Celsius.

The signals from the temperature sensors 2002, 2004 and the power generated by the battery cell(s) 2000 are communicated and transferred to a coupled device via electrical contacts on the battery pack. In one embodiment, the electrical contacts of the battery pack are designed to cooperate with the electrical contacts, of the portable computer unit 100. When a coupled device receives a temperature sensor signal from the battery pack, it can cause the coupled device to refrain from providing a charging current to the battery pack.

In one embodiment, the temperature sensors send their signal to the coupled device over the same output line 2014 (as depicted). In such an embodiment the coupled device knows only that the sensed temperature is out of range, but it does not know whether the upper or the lower limit has been exceeded. In another embodiment, the output line 2002, 2004 is coupled separately to the coupled device via the electrical contacts. In this embodiment the coupled device is able to determine whether the upper or the lower temperature limit has been exceeded.

Figure 21:
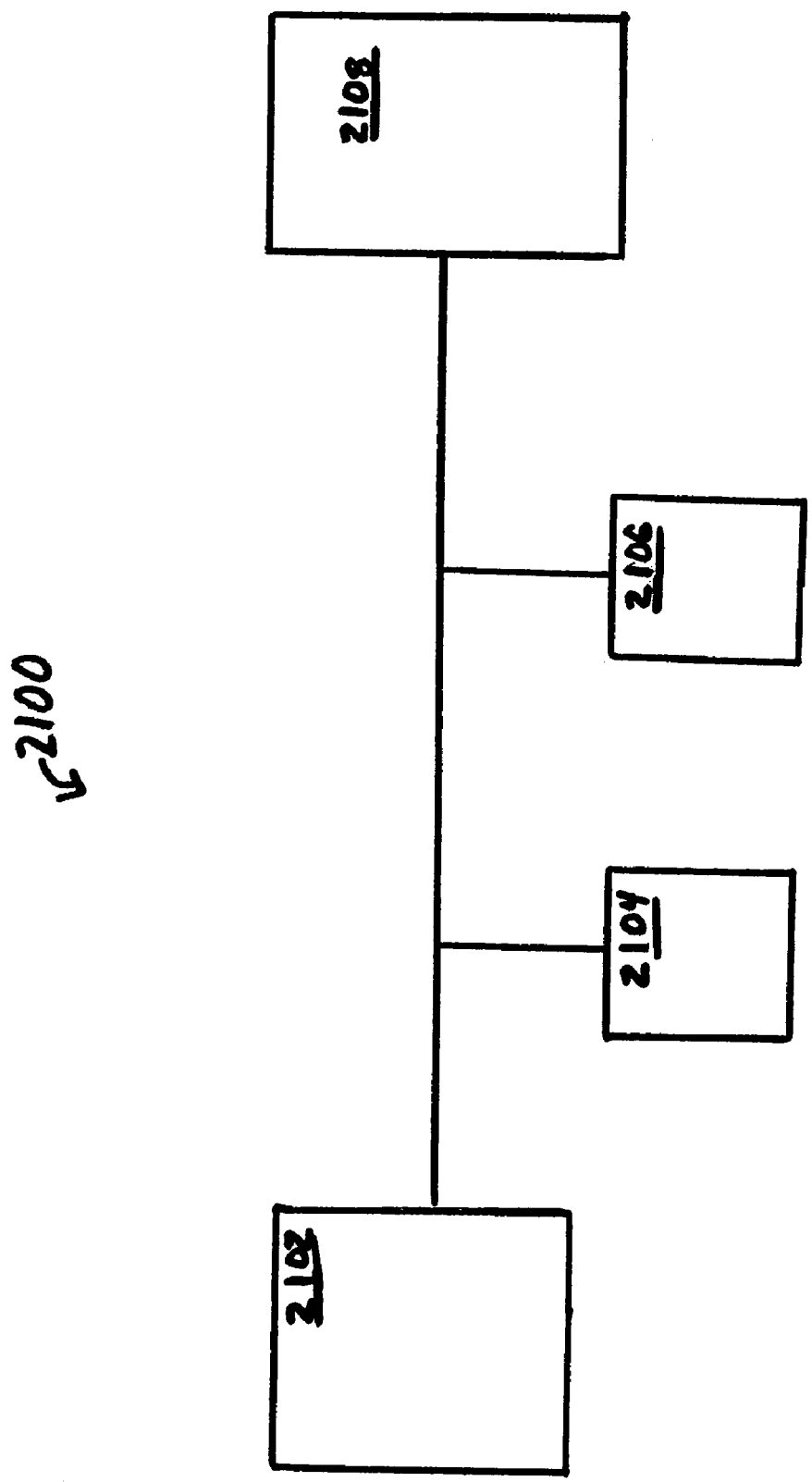
FIG. 21 is a block diagram depicting a compact flash card implementation.

FIG. 21 is a block diagram depicting a removable memory card implementation for a computerized device 2100 having a processor component 2102, a non-volatile memory component 2104 and a volatile memory component 2106. In this embodiment, the operating system for the device 2100, is stored on a removable memory card 2108. At start-up of the computerized device, the operating system is loaded into main memory 2106 from the removable memory card 2108. If desired, application programs or data files can also be stored on and loaded from the removable memory card 2108. Thus, the operating system, and any accompanying application programs or data files need not be stored on and loaded from an on-board non-volatile memory structure 2104 such as a permanent flash memory structure or a read only memory structure as in typical operating system implementations.

Storing such items on the removable card 2108 permits the size of the non-volatile memory structure 2104 to be reduced or minimized. Thus, the cost of the non-volatile memory structure 2104 is also reduced. In addition, efficiency is further enhanced and cost is further reduced since the storage capacity of the removable memory card 2108 can be chosen to closely match the size of the operating system and application(s) stored thereon. In prior systems, wherein the operating system was stored in a non-volatile memory structure, excess non-volatile memory capacity would have to be included to ensure that system would be capable of using any of a variety of different operating systems and applications. Use of the removable memory card implementation permits achievement of a close match between the memory size and the operating system, and possibly the applications as well, to be used on the computerized device.

In addition, this removable memory card implementation enables an operating system to be selected and loaded merely by coupling an appropriately sized (memory size) and configured removable memory card 2108, a Compact-Flash or other such card or module for example, with the computerized device. This feature is particularly useful for hand carried portable devices. Such devices are dropped frequently and can be damaged. When the operating system, applications and even data are on a readily removable memory module, such as a CompactFlash or SanDisk card for example, the memory module can simply be removed and placed in a functional terminal. Thus, the user can easily recover from the malfunction and can resume work, with little or no loss of data, applications, or settings, with only minimal delay.

In this implementation, the computerized device is configured to look to the removable memory card 2108, for the operating system at start-up. Upon start-up the operating system and any accompanying application programs or data files is copied to volatile memory 2106 for execution. One embodiment includes a 32 MB CompactFlash card for the removable memory card 2108 and 32 MB of onboard random access memory. It will be appreciated, however, that the configuration details are a matter of design choice and that a wide variety of configurations can be employed.

The remainder of this disclosure relates to the Model 700 portable data terminal of Intermec Technologies Corporation. Some of the components used in the Model 700 terminal are complex LSI devices with manufacturer's data sheets that are in excess of 100 pages in length. It is beyond the scope of this document to describe these devices in detail. Some of the devices in this design are customized components that are purchased.

The general use and function of each device will be described in overview and certain unusual or unique functions or applications will be described in more detail as necessary. In general, the schematics attempt to name all important nets. Additionally, many nets have both Low asserted (true) and High asserted (true) states. The low asserted state is indicated by a '−' at the beginning of the net name (−PWR_EN, thus enables power when low).

The Model 700 terminal has an Intel SA-1110 StrongArm-based processor that runs Microsoft Pocket PC. Power management and option flexibility are important engineering goals of this unit (while maintaining open system standards under Pocket PC). The Model 700 may accommodate different internal radios including: GSM, Lucent 802.11, RIM Model 802 and 902, and CDPD format radios. The terminal will also support various Blue Tooth implementations as they fit the physical requirements of the unit during its product life.

The heart of the terminal is the ARM SA-1110 processor that contains the CPU, GPIO (General Purpose Input/Output), LCD controller, SPI interface, IrDA interface, cache and memory controller chip. The Main Logic Board (MLB) contains 32 Mbytes of SDRAM, 512 K Bytes of BOOT FLASH, 10 Base-T Ethernet controller, combination sound/touch screen chip, quad UART, and the option of a single PCMCIA type II slot or serial radio module. The MLB also supports the scan decode engine (and perhaps a loading option) that is capable of popular bar code decoding as well as PDF 417 when used with the optional bar code scanner module.

Figure 22:
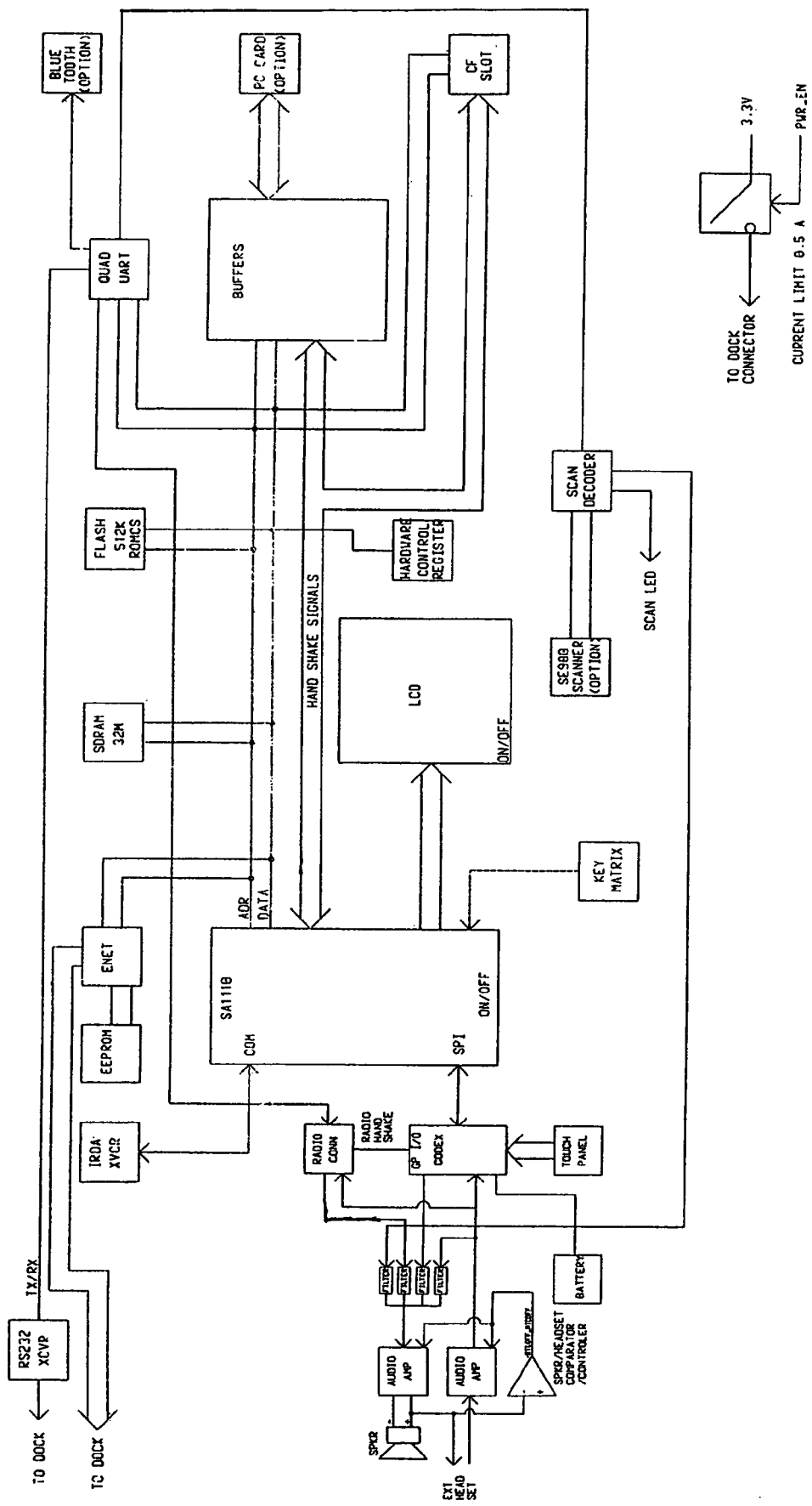
FIG. 22 depicts a top level block diagram view of the MLB of a system including a scan decode engine.
Figure 23:
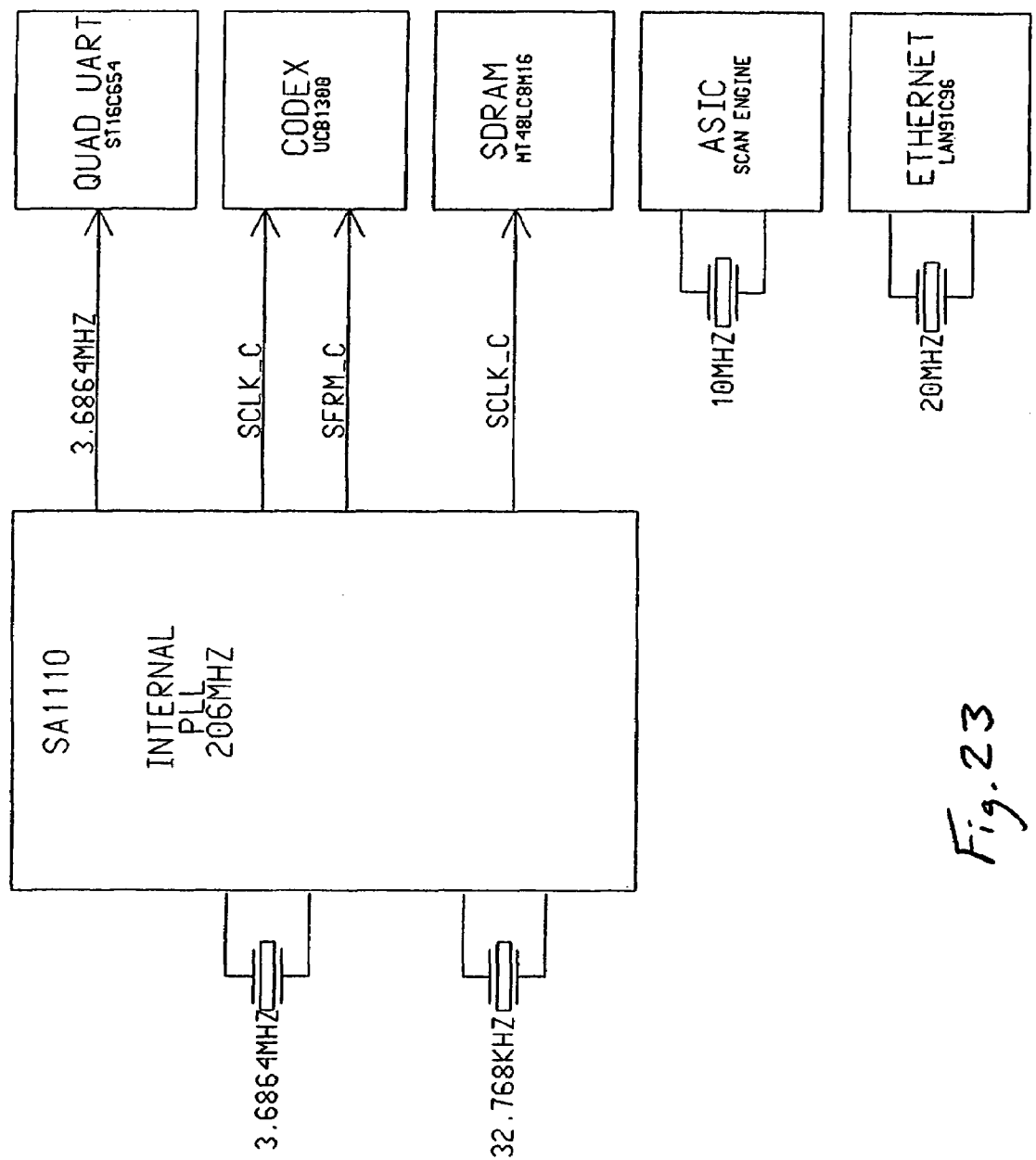
FIG. 23 depicts a clock map.
Figure 24:
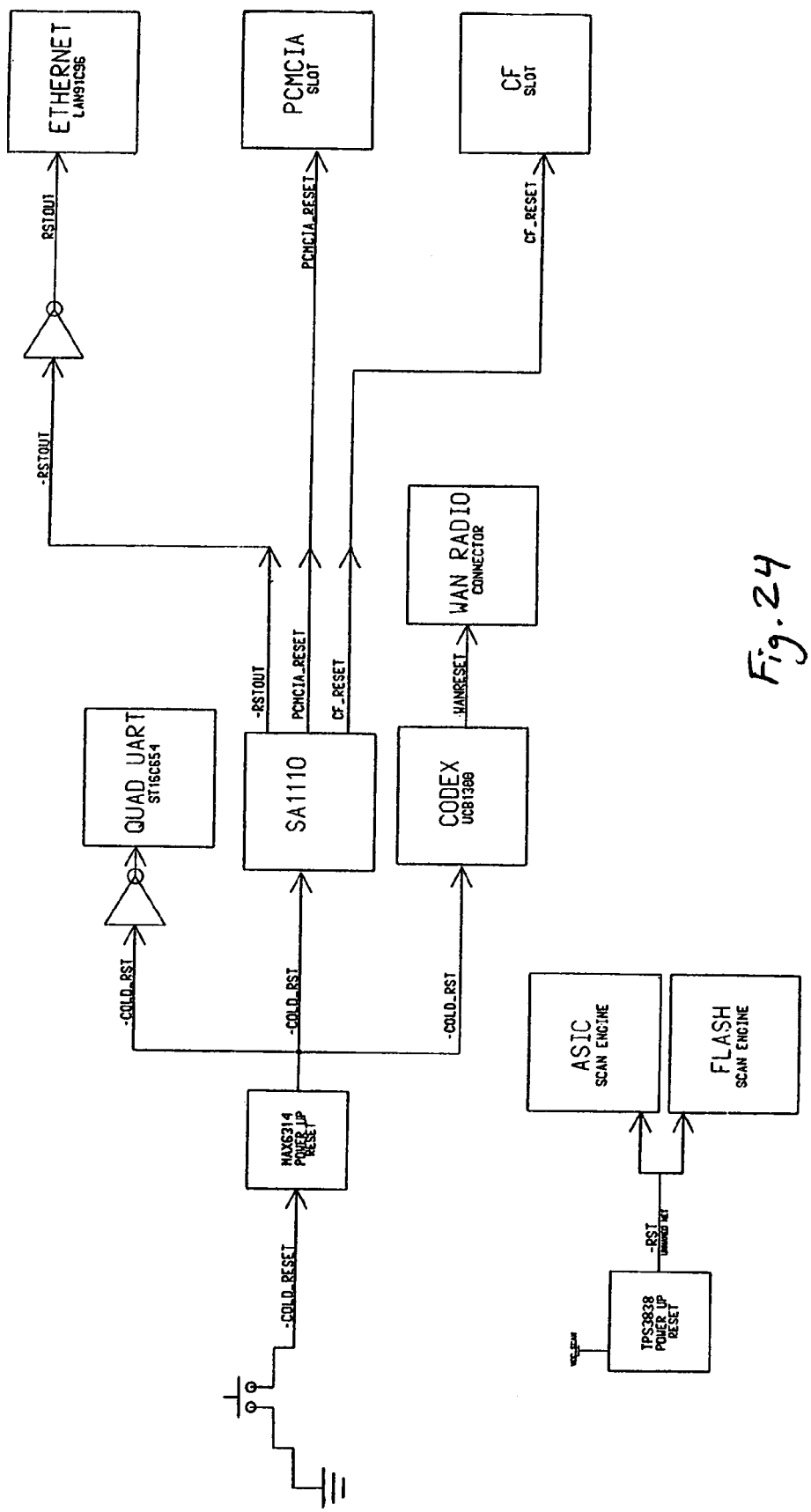
FIG. 24 depicts a system reset map.
Figure 25:
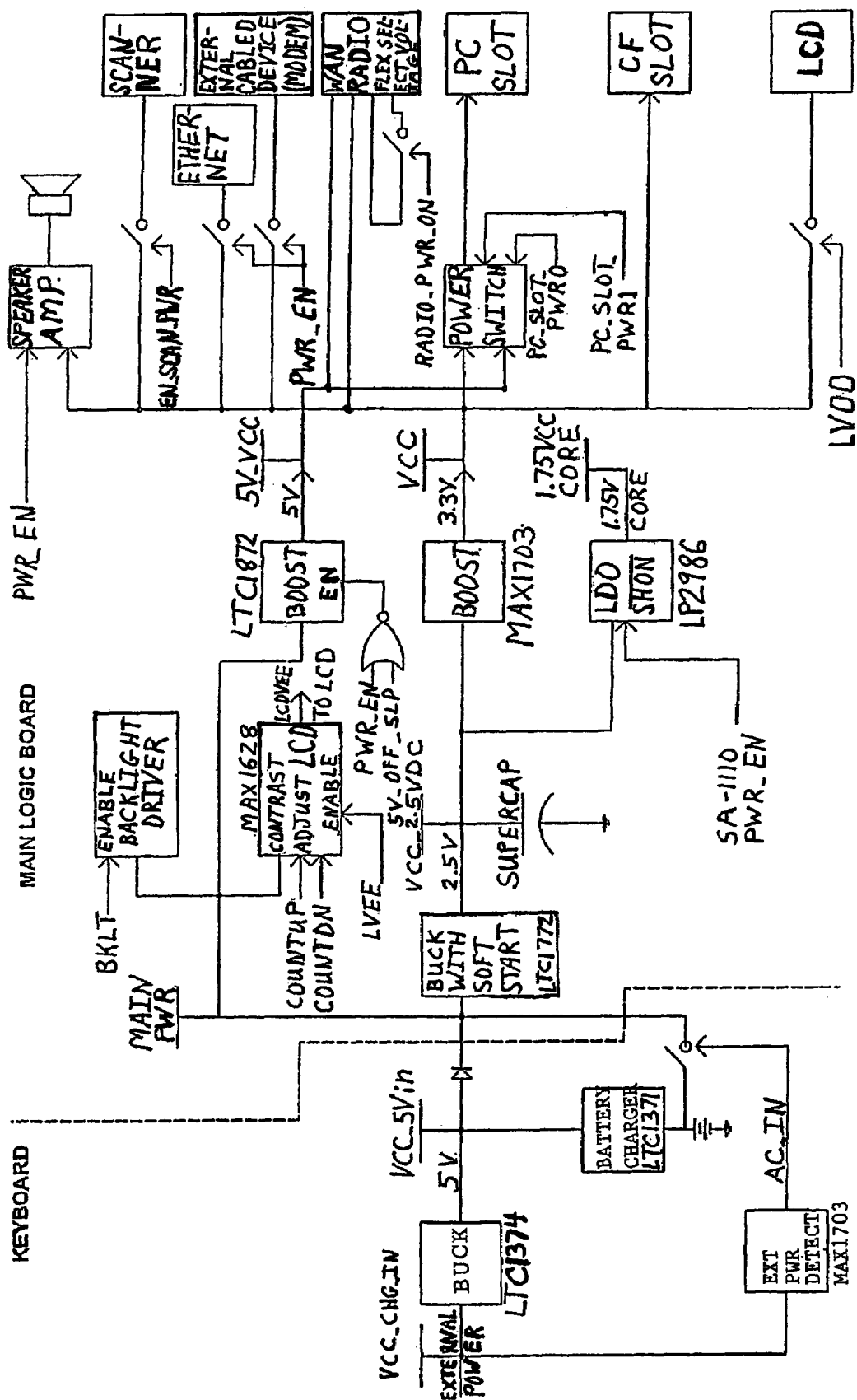
FIG. 25 depicts a power subsystem.

FIG. 22 depicts a top level block diagram view of the MLB of a system including a scan decode engine. Block diagrams have been included in the schematic figures. In addition, FIG. 23 depicts the clock map, FIG. 24 depicts the system reset map and FIG. 25 depicts the power subsystem for the Model 700.

The power system is comprised of several voltage regulators, power switches and miscellaneous circuitry that orchestrate the power subsystem. The main processor is also continuously operating, monitoring and controlling the power subsystem when operating. The system has the following four basic power states: DEAD, SLEEP, IDLE, and OPERATIONAL. A power states table follows:

| Power State | Conditions for state | Description |
| --- | --- | --- |
| No Power - Stone cold dead | No external AC Power No external Dock power No Battery Power No Super Cap power | Terminal will not have any power to do anything. All LEDs are "OFF" |
| Good Input Power | Either external or Dock power is > 8 VDC | Full battery charging with unit ON or OFF. Unit will turn ON and operate. Battery LED is solid RED for charging or solid GREEN for battery over 95% charged independent of unit being ON or OFF |
| No Battery | Battery is removed. | Battery LED is GREEN when external power is present. Battery LED is OFF when no external power is present. |
| Battery Internal Disconnect | Battery has been: over discharged or is over charged or is BAD | If on External power: Battery LED is "RED" for period of time charger tries to charge or recover the pack (5 hours). LED turns GREEN when charger either: times out after 5 hours, thinks the pack is BAD after failing to charge, or completes charge of the pack to over 95% |
| Battery is VERY LOW | Battery capacity is very low | Terminal will not turn ON. Battery LED will turn RED when ON/OFF key is pressed down and extinguish when released. |
| Battery is LOW | Battery has less than 25–30% of capacity left | Terminal will operate. Battery LED is "BLINKING RED" when the unit is ON |

-continued

| Power State | Conditions for state | Description |
|---|---|---|
| Good Battery | Battery capacity is in range of 20 to 100%. | Battery will support operation of terminal. Battery LED is "OFF" when unit is ON or in SLEEP mode. (no external power applied) |
| Battery Charging | Battery needs charging and external power is more than 8 volts. | Unit can be ON or in SLEEP mode Battery LED is "RED". |
| Battery charged | Battery over 95% charged and external power is present. | Terminal can be ON or in SLEEP mode. Battery LED is "SOLID GREEN". |

The terminal has three sources of power: an external charge power (wall charger connector or docking connector), a battery and a supercapacitor. In addition, as shown in FIG. 25, the terminal can operate from external charge power without a main battery.

The SA-1110 design incorporates functionality for housekeeping chores usually handled by a small microcontroller. For example, it performs the following functions: it monitors battery and estimates gas gauge, it monitors battery for "low battery state," it scans and decodes the keypad, it monitors the 1/0 (ON/OFF) key, it manages display backlight control, it reads temperature and adjusts LCD contrast, it communicates with the RTC (Real Time Clock), it manages the control status LEDs (Low Battery blink RED, GOOD Scan, keypad shifted to alpha plane), and it performs miscellaneous integrated functions.

In addition, the SA-1110 periodically reads the following voltages to provide battery status, then estimates the amount of "gas" left in the battery pack. BATT_COMP: Low battery threshold voltage for going into critical suspend, uses a 0% of battery capacity left in the battery, even though the battery will hold the unit in suspend for a half hour or more, sometimes up to several hours depending upon battery age and rate of discharge. BATT+: This is the power rail provided by the keyboard, and is the actual battery terminal voltage from the battery pack contacts. If no battery is installed and the unit is on external power, this voltage will be 4.2 VDC as driven by the battery charging circuitry. BATT_STATUS: This voltage signal is the output of the charge IC that indicates when the battery is charging or has completed 95% charging or has completed an attempt to charge the battery (times out after 5 hours). BATT_COMP: This voltage is a temperature-compensated signal that allows a more accurate cut off voltage to be established, based on battery temperature. As the battery temperature is lowered, the internal impedance of the cell increases, making it difficult to get the full capacity from the battery. In essence, this compensated voltage allows the software to know where the cut off voltage is. Since a fully charged battery voltage is 4.2 VDC, and with additional information such as cut off, or empty voltage, a simple linear prediction of the battery voltage gives us a crude gas gauge. The software can use these two pieces of information and predict the "gas" in the battery for display to the user. It also drives the LOW battery status LED to indicate when it is time to replace the battery or charge the battery (battery LED blinks RED).

The SA-1110 also checks the battery voltage when POWER UP or WAKE-UP AND OPERATE is requested. If there is insufficient battery charge to properly operate the unit, the terminal returns to SLEEP state as quickly as possible. The SA-1110 does not, however, provide any battery monitoring when in SLEEP mode.

The SA-1110 uses four GPIO bits as COLUMN inputs to detect keypad closures that trigger an interrupt to start the key decode process. Six ROW lines located in the hardware control registers complete the matrix for the keypad. By alternately driving a sliding zero pattern across the row line and reading the column lines, the depressed key can be identified. Note, however, that the 1/0 key (ON/OFF) key is not located in the key matrix. This key has its own signal (−RESUME_REQ) that is tied to an input to the SA-1110 for the purpose of waking up the processor when it is in SLEEP mode.

Further, the two scan trigger keys located on each side of the terminal are not part of the keypad matrix and have their own dedicated GPIO pins. This allows these pins to be selectively masked in the event that the user wants to disable one (or both) of the scan keys to prevent inadvertent triggering. By placing the scan trigger keys outside of the key matrix, they can generate an interrupt to the processor and wake it up from SLEEP or IDLE mode to start the next scan. The scan trigger keys may also be defined in software for other uses.

A temperature sensor is located near the LCD to read the approximate temperature of the LCD for use in automatically adjusting the LCD contrast over temperature. The SA-1110 communicates to a UCB1300 IC to read the input voltage (LCD_TEMP) applied from the temperature sensing IC. The temperature sensor provides the approximate temperature of the LCD to the processor during periodic requests.

The processor uses a look up table for the proper contrast voltage related to this temperature and adjusts the LCD contrast voltage regulator accordingly. The interface to the contrast voltage generator is not direct; the processor has to serially communicate over its SPI serial interface to the UBC1300, the UCB1300 has assigned GPIOs that control the contrast.

Serial communication to the UCB1300 allows individual control of these GPIOs, essentially expanding the number of GPIOs available to the SA-1110. The GPIOs associated with LCD control are listed in the table below:

| UBC1300 GPIO | Signal name | Description |
|---|---|---|
| IO0 | -LVDD | Enable power to the LCD and contrast generator |
| IO1 | LVEE | Enable contrast generator |
| IO2 | CONTUP | Adjust contrast up (count up) |
| IO3 | CONTDN | Adjust contrast down (count down) |
| IO4 | BKLT | Enable backlight |

The processor has control of power to the contrast generator and LCD, in order to provide proper power sequencing of voltage and contrast to the LCD. Improper sequencing of these voltages to the LCD can result in degradation of the LCD over time.

Once LCD power is on, the processor adjusts the contrast to the proper level. When the contrast generator initially powers up, it adjusts the contrast voltage to the middle of the range. The processor then adjusts the contrast either up or down based upon current temperature. The CONTUP or CONTDN lines are toggled the proper number of times to reach the desired contrast.

Software periodically reads the temperature sensor, averages this reading and then once a minute, resets the contrast generator (this places its output in the center of adjustment range) and then either steps the contrast UP or DOWN to the appropriate voltage level for the current temperature. An offset is stored in memory so that the users preference or last manual contrast adjustment is factored into the current contrast setting. The user also has manual adjustment via contrast adjust keys on the keypad to offset the automatic adjustment for LCD contrast that best suites the environment.

The processor monitors the keypad for the key sequence that toggles the backlight ON or OFF. Serial communication from the processor to the UCB1300 toggles the BKLT signal that enables the backlight drive circuit.

The SA-1110 has an internal clock, but it does not keep time through a COLD RESET, so an external clock IC is available. The processor communicates with the clock chip via two-wire bus and can set the time in both the internal and external RTC via a software utility. The external RTC can determine if it has lost the time setting due to loss of power to the chip.

The two, bi-color status LEDs on the keypad are controlled as follows. First, regarding the battery LEDs. The Green LED is controlled by the battery charger IC only. Battery is over 95% charged when the LED lights green. The Red LED has three independent controls. 1) The processor has control of this LED via the LOW_BATT_LED signal from the hardware control register. When the unit is normally operating without external power, the processor can blind this signal RED to indicate the main battery is LOW. 2) When the battery is charging, the battery charge IC will hold this LED ON until the battery is 95% charged. 3) Additional control of this LED is also via the 1/0 (ON/OFF) key. When this key is depressed the LED will light. The purpose of the 1/0 (ON/OFF) key lighting the LED is to provide visual indication that the unit has detected the key press. In a unit with a very low battery, the unit will not power up when the key is pressed, but the LED will flash, letting the user know the key depress was detected and hopefully reminding the user that the battery is low. When the unit is on external power, the battery is over 95% charged, and the user depresses the 1/0 key, both the RED and GREEN LEDs will be on at the same time.

The following applies to the check mark LED. When the unit has read a bar code correctly and it is a valid code for the system, the GREEN LED blinks briefly. The RED LED lights when the keypad is shifted to the alpha plane. Both the RED and the GREEN LEDs will be on when both the good bar code scan LED comes on and the keyboard is shifted into the alpha plane.

The SA-1110 has the following additional functions: a special wake event, a two wire serial port with IrDA, GPIOs with interrupt and control capability, a JTAG interface, an SDRAM memory controller, an address decoder, CF and PCMCIA special control signals, a general bus interface, and an SPI interface.

The two special inputs, GPIO: 0 and GPIO: 1 are used to wake up the processor after a VDD_FAULT or BATT_FAULT has occurred. GPIO: 0 is used for the 1/0 (ON/OFF) function. Note, however, that if the 1/0 key is held for over 10 seconds, VDD_FAULT on the SA-1110 is asserted and the unit is forced into a WARM RESET mode. GPIO: 1 is used for detecting ONCHARGE function. This is a system indication that external power has been attached and the processor needs to WAKE_UP (this may be from either a SLEEP state or recovery from the BATT_FAULT condition—meaning that the unit has experienced a VERY LOW BATTERY).

The processor contains three two-wire serial ports. Only one port is used for IrDA capability. This port is connected to the IrDA transceiver and implements only the slow, or 115.2 K data rate (V1.0). The IRDA transceiver is power managed by the use of –IRDA_EN signal in the hardware control register, which is under processor control.

Several devices issue interrupts to the processor, they are:

| SA-1110 GPIO | Signal | Description |
| --- | --- | --- |
| GP2 | -BATT_FAULT_IRQ | Low battery threshold |
| GP3 | ETHIRQ | Ethernet interrupt |
| GP4 | RADIOIRQ | UART WAN radio interrupt |
| GP5 | SCANIRQ | UART scanner interrupt |
| GP6 | COM1IRQ | UART COM1 port interrupt |
| GP7 | BTIRQ | UART Blue Tooth interrupt |
| GP8 | UCB_IRQ | UCB1300 interrupt |
| GP9 | SCAN_RIGHT | Right scan trigger switch |
| GP10 | SCAN_LEFT | Left scan trigger switch |
| GP15 | -RI | COM1 ring indicate |
| GP16 | -RADIO_RI | WAN radio ring indicate |
| GP17 | -DCD | COM1 Data Carrier Detected |

General purpose pin assignments are as follows:

| SA-1110 GPIO | Signal | I/O | Description |
| --- | --- | --- | --- |
| GP11 | COL0 | I | Keyboard column 0 |
| GP12 | COL1 | I | Keyboard column 1 |
| GP13 | COL2 | I | Keyboard column 2 |
| GP14 | COL3 | I | Keyboard column 3 |
| GP18 | CF_RDY | I | Compact Flash ready |
| GP19 | -CF_CD1 | I | Compact Flash Card Detect |
| GP20 | PCMCIA_RDY | I | PCMCIA slot Ready |
| GP21 | -PC_CD | I | PCMCIA Card Detect |
| GP22 | TS_CLK | I/O | Two wire bus Clock for temp sense & RTC communication |
| GP23 | TS_SD | I/O | Two wire bus Data for temp sense & RTC communication |
| GP24 | PCMCIA_RESET | O | RESET for PCMCIA slot |
| GP25 | CF_RESET | O | Compact Flash Reset |
| GP26 | -PCBUF_EN | O | Enable PC slot buffers |
| GP27 | 3.6M_CLK | O | 3.6 MHz clock to drive Quad UART |

The processor has a JTAG interface to facilitate testing and can be used to load the BOOT FLASH with a special program. These signals can be accessed on the board from a special set of surface contacts by using a special fixture that plugs into the Compact Flash slot. This is a method that the service center can reprogram the unit's BOOT FLASH in the event that it becomes corrupted. Normally the BOOT FLASH can be upgraded using software.

| JTAG signal | Description |
| --- | --- |
| TCK | Target clock |
| TDI | Target Data Input |
| TDO | Target Data Output |
| TMS | Target Control signal |
| TRST | Target Reset |

The processor contains the SDRAM controller. The SDRAM controller is active only when the processor is active. In SLEEP mode the controller places the SDRAM into self-refresh mode and stops operation. Note that the processor must apply the SDRAM row and address lines on the Address bus plus use this bus for normal operation.

| SDRAM Signal | Description |
| --- | --- |
| SDCLE1 | SDRAM Clock Enable |
| SDCLK1 | SDRAM Clock |
| -SDRAS | SDRAM Row Address Strobe |
| -SDCAS | SDRAM Column Address Strobe |
| -SDDQM0 | SDRAM data byte path |
| -SDDQM1 | SDRAM data byte path |
| -SDDQM2 | SDRAM data byte path |
| -SDDQM3 | SDRAM data byte path |
| -SDCS0 | Chip select |

The processor also has internal logic to provide programmable address decode to select external devices on the bus.

| Signal | Description |
| --- | --- |
| nCS1 | Unused |
| -UARTCS | UART chip select |
| -ETHERNET_CS3 | Ethernet chip select |
| -CNTL_CS | Hardware Control Register chip select |
| nCS5 | Unused |

The processor has a special set of signals used to allow the Compact Flash slot and the PCMCIA slot to share the bus. These signals are:

| Signal | Description |
| --- | --- |
| -POE | Output Enable |
| -PWE | Write Enable |
| -PIOR | Input/Output Read |
| -PIOW | Input/Output Write |
| -PIOIS16 | Input/Output 16 bits wide |
| -PWAIT | Wait |
| PSKTSEL | Socket select |
| -PREG | Register select |
| -PCE2 | Card Enable2 |
| -PCE1 | Card Enable 1 |

Several of the above signals are used as input to the PAL, which logically combines these signals and multiplexes them to the proper card slot. The PAL also has the capability monitor a special signal (-MMB) Master Mode Boot with redirects the -ROMCS signal from the BOOT FLASH to the PCMCIA slot to allow the processor to operate from program stored in a PCMCIA SRAM card.

The processor has the typical Address and Data buses along with a few miscellaneous signals.

| Signal | Description |
| --- | --- |
| A(25:0) | Address bus, bi-directional |
| D(32:0) | Data Bus, Bi-directional |
| RDY | Ready signal |
| -WE | Write Enable |
| -OE | Output Enable |

The SPI interface is a fast serial interface for communication between the processor and the UCB1300 IC.

| Signal | Description |
| --- | --- |
| TXD_C | Transmit Signal |
| RXD_C | Receive Signal |
| SFRM_C | Frame Signal |
| SCLK_C | Clock Signal |

The processor contains an LCD controller which can be programmed for a variety of LCDs, including color panels.

| Signal | Description |
| --- | --- |
| LD (7:0) | 8 bit data bus (monochrome LCD uses only 4 bits) |
| FRM | Frame clock |
| CP1 | Line clock |
| CP2 | Pixel clock |
| M | AC bias drive |

The Main Bus Devices all share the same data and address bus lines. Some devices use different subsets of the address and data lines to accomplish their functionality and each device may use the bus for longer or shorter amounts of time depending upon their speed. SDRAMs are the fastest devices on the bus, while PCMCIA card interface access is probably the slowest. Software programs the appropriate bus cycle time for the device that is currently using the main bus. The processor is typically in control of the main bus, however the Ethernet controller may hold the bus by means of the RDY line. The processor utilizes all the address and data lines.

The Boot Flash contains the code that the processor initially runs after termination of -RESET into the processor. This Flash is only two bytes wide on the data bus and has a limited number of address lines. The Flash can be loaded via the following methods: JTAG, Compact Flash Card, Ethernet, Radio Link and COM1 port. If the act of reprogramming the FLASH is interrupted before completing, the contents of the BOOT FLASH will be corrupted. The Boot Flash can only be recovered by programming through the JTAG port.

The SDRAM is the active memory area for the application and data when the unit is operational. The Model 700 has 32 Mbytes of SDRAM which is comprised of two 16-bit wide devices (data bus is 32 bits wide) that are actually each four banks or 2 M×16 bits. Other versions of the Model 700 can have more memory.

The SA-1110 DRAM controller determines how to set up the memory to function properly. The SA-1110 continually refreshes the SDRAM when the unit is operating, but when the processor goes to SLEEP, the SDRAMs are placed into self-refresh mode. The SDRAMs have the potential to communicate to the processor at 100 MHz rate, but the bus loading limits the main bus speed to one half that. The address bus is the most active, as it is used to provide both a Row Address and a Column Address to keep the SDRAM refreshed, as well as to support normal bus operation.

The Compact Flash slot is implemented to provide the non-volatile, system storage area for application and data. It can be sized to meet the customers' needs and is user replaceable to allow easy upgrade or transfer of data from one unit to another. The Compact Flash (CF) card resides on the main bus so it is MANDATORY to place the unit into SLEEP mode before removing the CF card to prevent loss of data, CF card corruption or unit lockup. The Model 700 will not function without a CF card unless special programming has been loaded into the BOOT FLASH to allow the unit to boot the application over a communication link. Where no CF card is implemented, the unit will have to re-load the application each time it powers up. The CF card slot provides ONLY 3.3 VDC. Thus, the CF card MUST BE a 3.3 VDC card.

The PCMCIA card slot is a type II slot powered from 3.3 VDC. Two signal, level translation switches are used for all the PCMCIA signals. The QS34X2245 parts contain essentially a FET switch for each signal and the FETs are biased to allow 3.3 VDC signals to pass through the part. When the PCMCIA slot is not used or if the power to the PCMCIA card it turned off, the buffers can be turned off to prevent loading of the main bus signals.

The Ethernet controller resides on the main bus, consisting of twenty address lines and sixteen data lines. Because of the idiosyncrasies of the SA-1110, the byte addressing of the Ethernet controller is directed by the —SDDQM0 and -SDDQM1 lines (which are normally associated with SDRAM). Ethernet 10 Base-T is supported, and the transmit/receive signals interfacing the isolation transformer route to the decking connector. The isolation transformer is located in the dock to remove size and weight from the terminal. This part is powered off when the unit is in SLEEP mode to minimize power consumption. During normal operation the chip is not used, and can be placed in idle state to save power. The Ethernet part has its own EEPROM, which stores the unique Ethernet ID.

A quad UART interfaces to the bus through eight data lines and three address lines. The address lines are used in conjunction with four chip selects to allow for proper communication to the internal registers of the UART. Each quadrant of the UART is completely separate and interfaces various peripherals to the processor.

This port is a standard full handshake, PC compatible communications interface. The full set of signals leave the MLB at TTL levels and are translated to RS-232 levels on the keyboard before they exit to the dock connector. The keyboard translator IC provides ESD protection.

| COM1 signal | Dock contact | Signal description |
| --- | --- | --- |
| RXD | pin 8 | RS-232 RXD (input to appliance) |
| -CTS | pin 9 | RS-232 CTS (input to appliance) |
| -DSR | pin 10 | RS-232 DSR (input to appliance) |
| -RI | pin 11 | RS-232 RI (input to appliance) |
| -DCD | pin 12 | RS-232 DCD (input to appliance) |
| -DTR | pin 13 | RS-232 DTR (output from appliance) |
| -RTS | pin 14 | RS-232 RTS (output from appliance) |
| TXD | pin 15 | RS-232 TXD (output from appliance) |

The RS1232 level shifter on the keyboard auto-senses power up to properly buffer the signals. If the external RS232 device is removed, the change in input signal voltage is detected by the translator, and it enters very low power mode. When the external device is reconnected or re-powered, the change in state is noted and the translator resumes operation. If the external devices are inactive, and the processor is programmed to wake up if in SLEEP mode and when external activity occurs (RI or DCD), the processor sees this activity in the form of an interrupt.

The Model 700 dock interface consists of a 16 contact connector which provides battery charging power, a fill 9-pin true RS-232 serial port, and Ethernet. The pin out is as follows:

| Dock Contact | Signal Description |
| --- | --- |
| pin 1 | Ethernet TXP (no transformer) |
| pin 2 | Ethernet TXN (no transformer) |
| pin 3 | Ethernet RXP (no transformer) |
| pin 4 | Ethernet RXN (no transformer) |
| pin 5 | PWR_OUT: 3.3 VDC @ 0.5 A to power external peripherals |
| pin 6 | Ground |
| pin 7 | Ground |
| pin 8 | RS-232 RXD (input to appliance) |
| pin 9 | RS-232 CTS (input to appliance) |
| pin 10 | RS-232 DSR (input to appliance) |
| pin 11 | RS-232 RI (input to appliance) |
| pin 12 | RS-232 DCD (input to appliance) |
| pin 13 | RS-232 DTR (output from appliance) |
| pin 14 | RS-232 RTS (output from appliance) |
| pin 15 | RS-232 TXD (output from appliance) |
| pin 16 | Charging power (10 to 30 VDC, 1.5 Amp) |

The scanning decode engine interfaces to the main processor through one of the Quad UART channels. The scanning decode engine is a separate processor that directly interfaces to a scanner module and does the bar code decoding before sending the decoded information to the SA-1110 processor. The following are the interface signals between the scan decode engine and the UART:

| Signal | I/O to UART | Signal Description |
| --- | --- | --- |
| RXCPU | O | Send decoded data to the processor |
| TXCPU | I | Receive commands or data from the processor |
| CTSCPU | O | Function TBD |
| RTSCPU | I | Function TBD |
| SCAN_TRIG | O | Causes the scan engine to read and decode a bar code |
| SYNCOUTCPU | I | Indicates when power can be turned off to the engine |

If the scanning option is not implemented, the UART inputs have pull up or pull down resistors to prevent floating inputs. The original scan modules scheduled for implementation are the Symbol 900 and 900 HS. The 900 HS module is required to read the PDF 417 codes. The power for the scan decode engine and the scan module are switched to allow the power consumption to be minimized.

The WAN UART interface allows for the connection of Wide Area Network radios that are connected to a special connector. A fill handshake set of serial signals plus additional control and power signals are implemented in the WAN connector. The following signals are included in the WAN connector:

| Signal | WAN connector pin # | I/O to WAN | Signal Description, use depends on specific radio connected, not all signals are used with each radio |
| --- | --- | --- | --- |
| RADIO_TXD | 1 | O | Transmit data to radio |
| RADIO_RXD | 2 | I | Receive data from radio |
| -RADIO_DTR | 3 | O | Data Transmit Ready |
| -RADIO_DCD | 4 | I | Data Carrier Detected |

-continued

| Signal | WAN connector pin # | I/O to WAN | Signal Description, use depends on specific radio connected, not all signals are used with each radio |
|---|---|---|---|
| -RADIO_RTS | 5 | O | Request To Send |
| -RADIO_CTS | 6 | I | Clear To Send |
| -RADIO_DSR | 7 | O | Data Set Ready |
| -RADIO_RI | 8 | I | Ring Indicate |
|  | 9 | I |  |
| WANID0 | 10 | I | WAN radio ID bit 0, flex determines |
| Unused | 11 | — | Unused |
| GSM_MIC | 12 | O | Headset microphone output to radio for voice |
| GSM_SPKR_IN | 13 | I | Headset or speaker, output of radio for voice |
| WANCONTR | 14 | O | WAN control line |
| WANRESET | 15 | O | WAN Reset, allow reset of radio via software |
| 5V_VCC | 16 | O | 4.4 VDC power for radio |
| Not Named | 17 | I | Power feedback by flex to be switched to the radio, either 3.3 or 4.4 VDC |
| 5V_VCC | 18 | O | 5 Volt power for radio |
| Not named | 19 | I | Power feedback by flex to be switched to the radio, either 3.3 or 4.4 VDC |
| VCC | 20 | O | 3.3 VDC power for radio |
| WANSHUTDN | 21 | O | Shut down signal to force radio into standby |
| VCC | 22 | O | 3.3 VDC power for radio |
| ground | 23 |  |  |
| ground | 24 |  |  |
| ground | 25 |  |  |
| ground | 26 |  |  |
|  | 27 | O | Switched radio power, either 3.3 or 4.4 VDC routed via the flex |
|  | 28 | O | Switched radio power, either 3.3 or 4.4 VDC routed via the flex |
|  | 29 | O | Switched radio power, either 3.3 or 4.4 VDC routed via the flex |
|  | 30 | O | Switched radio power, either 3.3 or 4.4 VDC routed via the flex |

The Blue Tooth (BT) interface is a serial interface with two handshake lines, but implemented in the Model 700 as a full communication port set of signals to be most flexible as new BT modules are available. Note that the BT interface and the scanner module share the same connector to save board space and minimize cost. Both sets of signals are listed below:

| Signal | Scan module and BT connector pin # | I/O | Signal Description |
|---|---|---|---|
| Ground | 1 | O |  |
| Ground | 2 | O |  |
| Ground | 3 | O |  |
| Ground | 4 | O |  |
| -BT_RI | 5 | I | BT Ring Indicate |
| GROUND | 6 | O |  |
| -BT_DCD | 7 | I | BT Data Carrier Detected |
| SOS | 8 | I | Scan: Start Of Scan |
| -BT_DSR | 9 | I | BT Data Set Ready |
| DBP | 10 | I | Scan: raw bar code data from scan module |
| -BT_DTR | 11 | O | BT Data Terminal Ready |
| SCANEN | 12 | O | Scan module Enable |
| -BT_CTS | 13 | I | BT Clear To Send |
| LUM | 14 | O | Enable illumination for CCD type of scanner |
| -BT_RTS | 15 | O | BT Request To Send |
| PHI1 | 16 | O | Scan: control signal for CCD |

-continued

| Signal | Scan module and BT connector pin # | I/O | Signal Description |
|---|---|---|---|
|  |  |  | type of scanner |
| BT_RXD | 17 | I | BT Receive Data |
| VCC_SCAN | 18 | O | Scanner power, 3.3 VDC |
| BT_TXD | 19 | O | BT Transmit Data |
| BT_PWR | 20 | O | Switched 3.3 VDC for powering BT |

The hardware control registers are two eight-bit latches that capture data off the lower 16 bits of the data bus. A write to these registers occurs when the combination of WE and –CNTL_CS (OR gate) generates a rising edge on the "clock pulse" input to the latches. Software controls the setting of these bits to control the associated hardware. During initial cold power up, the output enable for these latches is forced high to tri-state the outputs. When the register outputs are floating, the corresponding pull up or down resistors force the attached hardware to known low power states, to allow the unit to power up, determine if sufficient power is available to run, and then properly initialize the unit. This also minimizes the power level required to boot up, lengthening battery life and reducing power supply turn-on surge. Software can turn on the HCR output enables when it is properly initialized. The HCR outputs remain on in both sleep and operating modes. The signals in these registers are listed below:

| Signal | HCR bit # | Signal Description |
|---|---|---|
| PCPWR0 | 0 | Enable PC slot power, 3.3 V |
| PCPWR1 | 1 | Enable PC slot power, 4.5 V |
| -SCAN_LED | 2 | Good scan indication, light LED on keyboard |
| LOW_BATT_LED | 3 | Battery is low, light warning LED on the keyboard |
| -ALPHA_LED | 4 | Keypad is shifted into the alpha plane, light LED |
| RADIO_PWR_ON | 5 | Enable WAN power (turn on power routing FET) |
| -EN_SCAN_PWR | 6 | Enable scan decode engine & scanner power |
| 5V_OFF_SLP | 7 | Enable the 4.4 V power supply to be left on in SLEEP |
| ROW0 | 8 | Drive row 0 in keypad matrix |
| ROW1 | 9 | Drive row 1 in keypad matrix |
| ROW2 | 10 | Drive roW 2 in keypad matrix |
| ROW3 | 11 | Drive row 3 in keypad matrix |
| ROW4 | 12 | Drive row 4 in keypad matrix |
| ROW5 | 13 | Drive row 5 in keypad matrix |
| -EN_BT_PWR | 14 | Enable BlueTooth power |
| -IRDA_EN | 15 | Enable IRDA transceiver (take out of low power mode) |

The SA-1110 controls and interfaces the LCD panel as mentioned previously. Two other functions are also performed for the LCD panel: power sequencing and backlight control. Power is switched to the LCD panel and the contrast voltage generator by the control signal –LVDD available from the UCB1300 part. The LCD controls, which are GPIO pins on the UCB1300, are as follows:

| Signal | UCB1300 pin # | Input/Output | Signal description |
|---|---|---|---|
| -LVDD | 0 | O | Control power to LCD and contrast generator |
| LVEE | 1 | O | Enable contrast generator |
| CONTUP | 2 | O | Step contrast up |
| CONTDN | 3 | O | Step contrast down |
| BKLT | 4 | O | Back light enable |

The LCD power sequencing is as follows. To power up, 1) assert −LVDD, applying 3.3 VDC to the LCD and the MAX1620 contrast generator, 2) wait 20 msec, enable LCD controller while waiting, 3) assert LVEE, turning on contrast voltage generator, 4) read temperature of unit, looking up proper contrast voltage to match current temperature, and 5) adjust contrast by corresponding number of CONTDN or CONTUP steps. To power down the LCD, 1) de-assert LVEE, turning off the contrast generator, 2) wait 20 msec, disable LCD controller, and 3) de-assert −LVDD to turning off power to LCD. The above sequence insures that contrast voltage is never applied to the LCD when the LCD does not have power. This ensures the best LCD life. It also ensures that LCD interface signals are not active while the LCD is powered off, to prevent CMOS latch up.

The UCB1300 has several functions and interfaces that access the processor via a high speed serial interface (SPI). These include a touch screen interface, an A/D converter, audio codecs and the GPIO (General Purpose Input Output) pins. The UCB1300 has a built-in touch screen controller that interfaces to a 4 wire resistive touch screen. The touch screen controller has 10 bit A/D resolution.

The UCB1300 contains a 10 bit A/D that can be multiplexed to four external analog inputs that are scaled to reading roughly half the applied voltage by internal resistors. The following inputs are monitored by the software using this part:

| A/D input | Signal | Description |
|---|---|---|
| AD0 | BATT_COMP | Reads a temperature compensated voltage to be used in estimating battery cut off & gas gauging. This voltage is buffered to prevent loading of signal. |
| AD1 | BATT+ | Reads battery voltage after slight filtering |
| AD2 | LCD_TEMP | Temperature sensor output for LCD |
| AD3 | BATT_STATUS | Battery charger status: low charging, high charged |

The UCB1300 includes a 12-bit audio codec that can be used in sampling or playing back audio. This codec allows the playing of .wav files out to headphones or to the internal speaker. The output is connected to the amplifier that drives the speaker and can also be directed to the headphones. The codec input is connected to the GSM_MIC signal, which is an amplified external input from the headset. The signal must be attenuated before input into the codec, as this input is expecting only mV inputs from a microphone.

The UCB 1300 GPIO pins in the table below are used as output in various ways. These inputs are reset and defined as inputs after a −COLD_RST, the processor will take some time to initialize as outputs. For those signals that must be controlled until the software can drive them, they are pulled up or down as required.

| Signal | UCB1300 pin # | I/O | Signal Description |
|---|---|---|---|
| -LVDD | 0 | O | Controls power to LCD and contrast generator |
| LVEE | 1 | O | Enables contrast generator |
| CONTUP | 2 | O | Step contrast up |
| CONTDN | 3 | O | Step contrast down |
| BKLT | 4 | O | Back light enable |
| -ETH_EN | 5 | O | Enables Ethernet IC, take out of low power mode |
| WANRESET | 6 | O | Reset WAN radio |
| WANSHUTDN | 7 | O | Force WAN radio into standby |
| WANCONTR | 8 | O | General use WAN control signal |
| -SCAN_FLASH_EN | 9 | O | Enable scan decode engine FLASH to be programmed |

Figure 26:
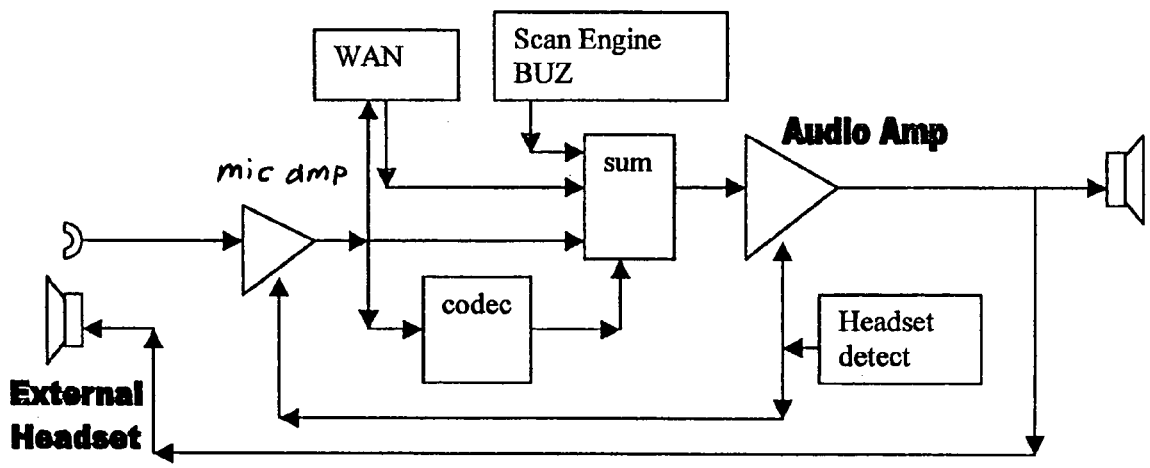
FIG. 26 depicts the components and relationships of the audio subsystem.

The audio subsystem includes all the components involved with generation of sound and the interface of the headset for use with radios. FIG. 26 depicts the components and relationships of the audio subsystem. The audio system has a variety of components. The terminal has an external headset jack on the keyboard that allows a standard headset to be connected. The headset microphone amplifier drives the amplified speech into three devices: the WAN radio, the codec and the summing amplifier (audio amplifier).

Voice input, of course, is intended for radio communication, but the codec can also capture voice input for applications developed for message recording or voice recognition. The WAN radio can also receive voice audio, and it is routed into the summing amplifier, which drives the headset speaker.

Volume control of the received voice over radio is controlled by the radio. The scan decode engine can also generate sounds as it is collecting bar code information to provide feedback to the user. These buzzes or tones are routed into the summing amp to either drive the headset if attached, or the internal speaker. The codec can generate sounds as directed by the operating system. These sounds are collected by the summing amp and are driven to the headset if attached, or the internal speaker.

The audio amplifier has three inputs: 1) WAN radio receive audio (GSM_SPKR), 2) Codec output (SPKR), and 3) Scan decode engine. Each input to the audio amplifier is DC level blocked with a series capacitor. A series resistor determines how much gain the amplifier will provide on a specific input.

Typically, the codec output and the scan decode engine audio signals will be driven into the internal speaker. If a headset is connected, the amplifier output will be disconnected to the internal speaker by the −BTLOFF_MICOFF signal line. When the headset is connected, all three sources will be summed and driven to the headset. When the unit is in SLEEP mode, the —PWR_EN places the audio amplifier in a very low power mode. No sounds are emitted when the unit is in SLEEP mode.

When the headset is inserted into the jack, the headset detect circuit senses the presence of the headset by the fairly low impedance of the headset speaker to ground. An LMC331 comparator detects this low impedance path to ground and generates the −BTLOFF_MICOFF signal, which the audio amplifier is placed into the mode to silence the internal speaker and only allow the headset to be driven. The headset microphone amplifier is located on the keyboard, as close to the input signal as possible. This amplifier increases the signal and also provides significant filtering to prevent unwanted RF energy, coupled into the headset cable, from causing a feedback path to the radio.

A small PAL is used to gather several miscellaneous logic gates into a single part to save board space and cost. The main functionality of this logic is to allow the CF slot and the PCMCIA slot to be shared by the limited number of control signals coming out of the SA-1110. The SA-1110 does not have sufficient number of signals to independently control both the CF and PCMCIA slots.

The PAL also contains logic to load dump sections of circuitry when a low battery situation occurs to better insure that the unit can get to the SLEEP state. The LOAD DUMP tri-states the outputs of the Hardware Control Registers to force power controls to off for each of the following: the Scan LED, the Low Battery LED, the Alpha LED, the WAN Radio Power, the Scanner Power, the 4.5 V DC/DC, the Blue Tooth Power, and the IRDA power. The LOAD DUMP also turns off power to the PC slot, disables bus buffers for the PC slot, and turns off 3.3 VDC provided to the docking connector to power peripherals. Along with this LOAD DUMP, the EL backlight circuit is also powered off.

The scan decode engine consists of three main ICs and a Symbol 900 or 900HS scanner module. The three ICs are an ASIC scan engine, Flash and SRAM. The ASIC contains a DSP with custom coding focused at collecting information from the scanner module, decoding the bar code and passing this decode scan via a serial interface to the quad UART. The FLASH contains additional programming that expands the scanning functionality. This Flash can be uploaded over the serial link. The SRAM is a fast memory scratch pad that allows storage of data for processing scanning algorithms. The address bus (SCAN_A (15:0)) and data bus (SCAN_D (15:0)) are separate from the main processor bus and interconnect the three main scanning ICs for the scan decode engine.

The main processor has control over the initiation of scanning a bar code. The main processor receives an interrupt form either the SCAN_LEFT or SCAN_RIGHT inputs (on GPIOs) when either scan key is depressed. The processor first turns on power to the scan decode engine via the Hardware Control Register signal EN_SCAN_PWR. The scan decode ASIC has its own "RESET" generator and properly powers up. The processor then sends the SCAN_TRIG (DTR) signal over the serial interface to the scan decode engine. Then the ASIC handshakes with the scanner module to read the bar code. The raw bar code data is collected from the scan module and the decode algorithms are run. The decoded bar code data is sent to the processor by the serial interface.

Depending upon the application implemented in the unit, the software may light the "GOOD SCAN" LED once the bar code is read successfully or it may wait until the bar code information has been sent via RF link to a system processor and properly recognized by the system. The scanning EEPROM connected to the ASIC stores configuration information that is accessed upon each power up. When the scan decode engine is not needed it should be powered off to conserve battery power. The power up initialization time is less than 100 msec.

The special control signal –SCAN_FLASH_EN is a GPIO from the UCB1300. This signal enables the scan decode FLASH to be upgraded or re-flashed. Under normal operation this signal will remain high, to protect the FLASH from being changed.

The power system involves the external power system, the battery system, the supercapacitor, the keyboard board power elements and the MLB power elements.

The external power can be input to the terminal via the external wall charger jack or the docking connector. The external wall charger is a universal module that can accept IEC320 power cords allowing the power cord to be matched to the country the power supply is used in. The input voltage range is 80–240 VAC 50–60 Hz. The wall charger outputs: 12 VDC @ 1.5 A max.

A cigarette lighter adapter is also available that will operate off 12V or 24V vehicle systems and provide protected power to the docking connector on the terminal. Input voltage for this device is 11–28 VDC. Output voltage for this device is 11.5–13 VDC Output current is temperature dependent: 2.5 A@<45 C, 1.5 A@<55 C. It is not recommended that auto adapters be used with the barrel Jack because the nature of the environment will quickly result in unreliable connections.

All power provided to the 700 must never exceed 30 VDC input. Surges of spikes on input power will cause damage to the 700 unit. Use of appropriate docks or power adapters can prevent damaging power conditions from being passed onto the input power for the terminal.

The docking connector includes power that is provided either from the same wall charger that can connect directly to the terminal or in the case of a vehicle dock, the power comes from the vehicle electrical system. The vehicle dock has protection circuitry to limit the transients found in a vehicle power system according to SAE J1113. The input voltage range through the dock connector is 8 to 28 VDC. The expected input current at 12 VDC is 1.5 A max.

The battery pack is a single cell, 2000 mAh or higher lithium ion battery housed in a plastic case. The case is sealed and contains a circuit board that has the protection circuitry required to protect the battery cell from abuse. The circuit board also contains a circuit that provides a signal indicating when the battery is in the proper temperature range for charging. This BATT_TEMP_OK signal will be a logic high when the cell temperature is between 0 and 50 C. The signal is pulled low when the cell temperature is either above or below this range. This signal is required to enable battery charging. The protection circuitry prevents overcharging, over discharging and protection against shorting the pack.

The battery pack contacts are surface pads on the pack PCB and defined as follows:

| Pin Number | Description |
| --- | --- |
| 1 | – BATTERY |
| 2 | – BATTERY |
| 3 | BATT_TEMP_OK (signal output from the pack) When battery is in proper temperature range for charging. |
| 4 | Battery temperature sensor power (input to the pack for the sensor to work) |
| 5 | + BATTERY |
| 6 | + BATTERY |

The contacts for the mating connector are numbered as in the table above, but there are just four actual pads on the battery pcb. The outside pads on the battery pcb are twice as wide and count as two pins in the table above.

A one Farad capacitor (Super Cap) is used in the power system to maintain the unit in SLEEP mode while the battery is replaced. The Super Cap in intended for only supporting the terminal in "SLEEP" operation for very short periods of time to prevent data/program loss (during main battery swap). The Super Cap's main purpose is to support SDRAM, CMOS and RTC retention when both the external charge power and the battery power are not available (during SLEEP, with main battery removed and no external power connected).

If the unit is suspended before the main battery is removed, the Super Cap will maintain power for over three minutes, which should be sufficient to change the battery. Failure to place the unit into SLEEP before removing the main battery will typically reduce the backup time of the Super Cap by about 15–30 seconds. However, if a very high power event occurs (i.e. radio transmit) or if the unit started a process that could not be interrupted (i.e. a write to the CF card) for a few seconds, the possibility that the unit would exhaust the Super Cap and lose data is real. The unit should be placed in Suspend before removing the main battery unless the unit is already in SLEEP.

The keyboard power system consists of an input Buck Regulator, a battery charger, an isolation FET and a 3.0 VDC analog LDO regulator. The input Buck Regulator (labeled Input Supply) is a switching regulator that drops the 8–30 VDC input, external power down to approximately 4.7 VDC for use in simultaneously charging the battery and powering the terminal. The resistor string connected to the SHDNL input on the LT1374 regulator is set to prevent operation of this regulator below 8 VDC input. The output should be able to provide 2.0+ A continuously over the operating temperature range. The output (VCC_5VIN) is diode isolated from the MAIN_PWR rail to prevent the leakage current of this supply from being a load on the battery when external power is not applied. MAIN_PWR is main power rail generated from either the external power thru the INPUT SUPPLY or from the battery. This main power rail is output from the keyboard to the MLB.

Battery charging is accomplished with a LTC1731. This chip will do the following if external power is available. It will detect whether the battery is over discharged and will trickle charge it until it recovers to the point of being able to accept regular charge. It will charge the battery at a constant current of 0.75 A (fast charge mode) until the battery terminal voltage reaches 4.2 V. It will charge the battery with a constant voltage until a charge time out of approximately five hours. It will also provide an LED status indication of charging (RED) and over 95% charged battery (GREEN).

Battery charging is allowed only if the BATT_TEMP_OK signal is high indicating that the cell temperature is in the proper range of 0 to 50 C. Removal of the battery drives this signal low, disabling the battery charger. Removal of the battery and then reinserting it while on external power will restart the battery charge cycle of five hours. There is a transistor between the BATT+ terminal and the main power rail (MAIN_PWR) to disconnect the main power rail when external power is available for the terminal. This prevents the power from MAIN_PWR from sinking into the battery while the battery is ON CHARGE.

A voltage detector is used to monitor the output of the Input Buck Supply. When this Supply is active, the voltage detector disconnects the battery from MAIN_PWR to allow proper battery charging. When external power is removed, the output of the Input Supply drops off and the voltage detector then turns the FET back on thus reconnecting BATT+ to MAIN_PWR. During the transition, the body diode of the FET allows the battery to provide power to MAIN_PWR rail as needed.

An MIC5213 LDO regulator is used to take the PWR_OUT voltage provided by the MLB and generate 3.0 VDC used to power the headset microphone amplifier circuitry located on the keyboard. This power is also used for the ALPHA LED and the SCAN LED. When the unit is in SLEEP mode, the PWR_OUT is turned off, thus the VCC3.0_ANALOG power is off during SLEEP as well.

The keyboard also has VCC (3.3 VDC) provided from the MLB to power the RS232 translator chip.

The PWR_OUT is a switched power on the MLB. The intent is to provide power to an external device (i.e. external modem) that is connected to the docking connector. Output power is limited to 0.5 A, of which a few tens of mA are shared to provide power to the keyboard VCC3.0_ANALOG.

The Main Logic Board (MLB) power system is comprised of several blocks and is described in the following paragraphs.

The MLB input power is called MAIN_PWR and the main regulator that this supports is the 2.5 VDC SUPPLY. The first level of voltage conversion was chosen to generate this specific voltage level to store energy in the 1 Farad Super Cap. The Super Cap is chosen so as to fit within the space available for it in the housing and to have a low enough internal series resistance to put sufficient energy back out to support the main processor regulator.

The 2.5 V regulator is a LT1772 switching regulator that is used in a buck configuration to drop the input voltage (range of 2.5 to 4.5 VDC) down to 2.5 VDC, which is the maximum working voltage for the Super Cap. The buck has a soft start feature to limit the input current to less than 2 A while it is initially charging up the large, 1 Farad Super Cap. An FET is used between the output of this regulator and the Super Cap. This permits elimination of the leakage of the circuitry on the MAIN_PWR rail in situations where the battery has been removed and there is no external power source (essentially the unit is retaining state off the Super Cap). The isolation FET is controlled by a comparator in the 3.3 SUPPLY regulator. This regulator can output 2 A at input voltages above 2.8 VDC.

Almost all the circuitry on the MLB is powered from 3.3 VDC. The 3.3 V SUPPLY takes power from VCC_2.5VDC rail and boosts it up to 3.3 VDC at up to 1.5 A. The MAX1703 is a switching boost regulator with two internal comparators, which are used to generate ONCHARGE and a BATT_OFF signals. The ONCHARGE signal indicates to the processor that the unit is operating on external power. This can allow a unit with low battery to resume operation and properly clear LOW BATTERY state when external power is connected. Regarding the BATT_OFF voltage, comparator output controls the isolation FET between the 2.5 Supply and the Super Cap. When the MAIN_PWR voltage level is too low to sustain the VCC_2.5VDC rail, the 2.5 rail is disconnected from its supply to minimize the leakage current from the Super Cap backwards through the 2.5 Supply.

The MAX1703 can operate in two different modes to maximize the efficiency based upon load current. Under heavy load, such as normal operation, the CLK_SEL input needs to be high. Under light loads, such as in SLEEP, the CLK_SEL pin is pulled low by the PWR_EN signal.

The processor operates off of two voltages. The Input/Output ring voltage is VCC (3.3 VDC) and the core voltage is 1.75 VDC. The LP2986 regulator is a low drop out type that takes 2.5 VDC rail and regulates it down to 1.75 VDC. This regulator is controlled by PWR_EN signal from the processor, which turns on the core voltage when the processor is running and turns it off when the unit goes to SLEEP. This regulator can output up to 200 mA max.

The 5 V required by this unit is to support RIM radios. Unfortunately, some of the radios consume large amounts of current with peaks of over 2 A possible. Thus, the performance of this regulator will be subject to the amount of power available on input to the 4.5 V RADIO SUPPLY (MAIN_PWR, which in turn is really either battery power or external power).

The 4.4 V regulator is a LTC1872 switching regulator in a boost configuration. The regulator has a soft start feature to minimize the inrush current that would normally occur due to the large amount of capacitance on the output. With this configuration, 5V_VCC can not be turned off and will typically be at MAIN_PWR rail level when the regulator is turned off.

The regulator is normally turned off when the processor is in SLEEP mode (PWR_EN low), but this can be disabled by software if the 5V_OFF_SLP signal is high. If either PWR_EN or 5V_OFF_SLP is high the 4.5 V SUPPLY is turned on. Down stream of the 5V_VCC rail are power switches for the WAN radio and PCMCIA slot that keep voltage from being applied to loads when not needed. Also, these loads can be quickly dumped if a low battery condition is detected.

The LCD contrast generator (LCD VEE PSU) is a MAX1620 switching regulator that operates from VCC (3.3 VDC) to generate a voltage of approximately 20 VDC for controlling LCD contrast. The regulator is intended for LCD applications and when initially powered up will output a contrast voltage in the center of its adjustable range. Toggling the CONTUP and CONTDN signals cause the contrast voltage to step up or step down respectively. The full range of adjustment voltage is divided into 31 steps.

The generator operates from a switched VCC (3.3 VDC) and the LVEE signal when high enables the contrast generator. The sequencing of LCD power and the LCD contrast voltage are important and discussed in the section on LCD interface. The LCD contains a resistor divider that is connected in parallel with a resistive divider on the MLB to provide a feedback voltage to the contrast generator.

The EL backlight is driven by a simple boost circuit that takes VCC and jumps it up to the 100+ VAC needed. The backlight drive IC is enabled by the signal BKLT out of the UCB1300. The backlight brightness has only one level, no adjustment is possible as in previous terminals. An AND gate is used to allow the backlight circuit to be load dumped when low battery is detected. Also, the BKLT_EN signal is routed to the keyboard to be used in the event a backlighted keypad is used.

The power out switch is a special current limiting switch that is controlled by PWR_EN. When PWR_EN is high, the switch will apply VCC to the keyboard and in turn to the docking connector. This power is intended to power the low power needs of the keyboard microphone amplifier and LED. It also allows up to 0.5 A to be provided to an external peripheral connected to the docking connector (an external modem for example).

An optional PCMCIA Card slot can be power from either VCC (3.3 VDC) or 4.5 VDC under software control. The MIC2562 dart powerful than route-power from either source to the PCMCIA slot via control from PCPWR0 and VCC5_EN signals. The PCPWR0 and PCPWR1 signals are software controlled thru the Hardware Control Registers. The PAL also has the logic to load dump these signals under low battery condition.

| | |
|---|---|
| PCPWR0 | Asserted in regular mode, enables 3.3 VDC to PCMCIA slot |
| PCPWR1 | Asserted in regular mode, enables 4.5 VDC to PCMCIA slot |

The Ethernet chip power is turned off in SLEEP mode to conserve several mA of current. A single FET is used to switch the power under control of –PWR_EN signal. This is an inverted PWR_EN signal, controlled by the processor.

The scan decode engine does not have any low power modes of operation, so it is necessary to remove power from this subsystem when not in use. A simple FET is used to control power to the scan module and scan decode engine. This FET is controlled by the EN_SCAN_PWR signal out of the Hardware Control Registers. When the power is turned off to the scanning circuitry, the UART signals that interface to this circuit must be placed in the logic low state to minimize SLEEP current.

The power to the WAN radio must be controlled by software to minimize power consumption. The power required by different WAN radio needs to be either 4.5 VDC or 3.3 VDC or some derivative of these voltages. To simplify the requirements and insure a wide selection of radios, the following compromise was made. For WAN radios that need either 4.5 V or 3.3V, both voltages are brought out to the WAN connector. The individual flex is customized for interconnection to the various WANS, thus the flex is customized to route the needed voltage (either 3.3 or 4.5 V) back onto the MLB. This returned voltage is then routed to the WAN radio power switch (FET) and back to the WAN connector where the flex carries this selected power directly to the WAN radio. The WAN radio power switch is controlled by the RADIO_PWR_ON signal that is in the Hardware Control Register. For Radios that need an odd voltage to run, voltage dropping devices such as LDOs or diodes can be inserted on the WAN flex to get to the desired voltage.

The Low Battery Detect is based on the MIC833 part, which is a two level comparator with hysteresis. The level detector is set up to cause the processor BATT_FAULT input to be held when the battery voltage has reached a critical point where operation cannot continue. The processor will then be interrupted declaring the battery is low. When the interrupt is honored, the processor must quickly get to a low power mode (disable internal devices) and enable the BATT_FAULT signal by going to SLEEP (going to sleep issues –RSTOUT which enables BATT_FAULT to assert on the SA-1110). Once BATT_FAULT is asserted the processor will not wale up until it is removed.

The battery voltage, once it has reached the low threshold and caused the BATT_FAULT, must be recovered to a higher threshold (due to the hysteresis of the MIC833) before BATT_FAULT de-asserts. The recovery method involves replacing the battery with a charged one or placing the unit on external power which disconnects the battery and applies over 4 V to MAIN_PWR. In the event of external power being applied, the ONCHARGE input to the processor is used to wake up the processor, to determine that the system was forced into SLEEP by a low battery, and to ensure that the proper house keeping is done to recover the unit.

The battery voltage is also a rough indication of how much battery time ("gas") is available. The UCB1300 A/D converter is used to read the battery voltage and the BATT_COMP voltage to provide information that is used as a "gas gauge" estimating the battery run time. The amount of gas is estimated from a linear range of a fully charged battery, which is 4.2 V, and the Low Battery Threshold where there is very little gas left. By measuring the current battery voltage (BATT+) and the current Low battery threshold (BATT_COMP), a rough estimate of the amount of "gas" left in the battery can be made. This method is accurate within approximately +−15% and can therefore give the user a feel for the state of relative battery charge. An analogy to this is a gas gauge on a car. The driver usually does not pay much attention to exactly how much fuel is left until the level gets close to empty. At this point, the driver (operator) knows that it is time to refill (recharge).

Figure 27:
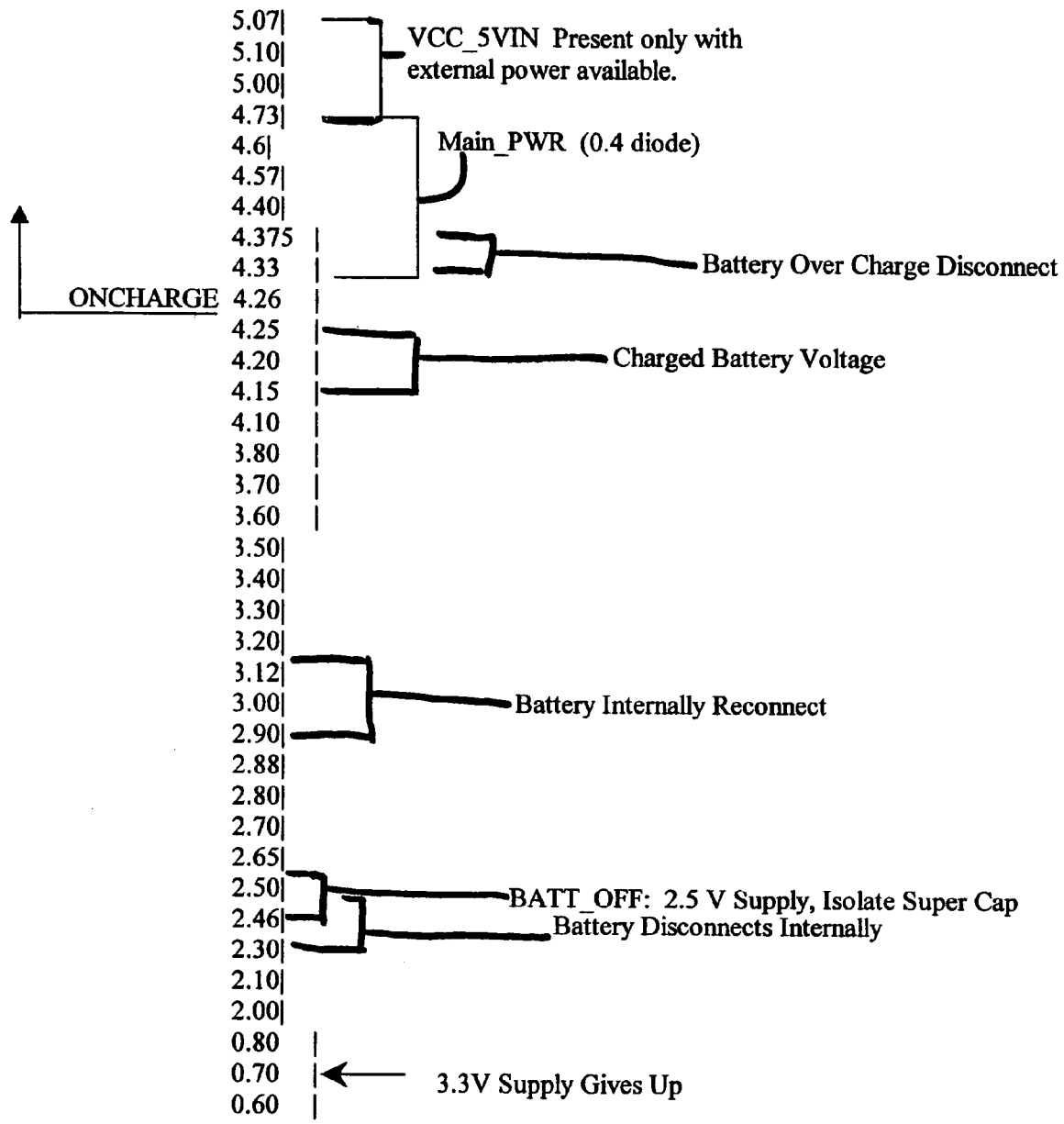
FIG. 27 depicts some of the voltage levels used to control various sub-systems.

The power system has several voltage levels to control various sub-systems. FIG. 27 depicts some of the more important levels. The battery has three internal thresholds: Battery Internal Disconnect, Battery Internal Reconnect and Battery Overcharge Disconnect. At the Battery Internal Disconnect threshold, the protection circuitry inside the battery decides that the cell voltage has reached a point at which further discharge will damage the cell and the internal FETs are turned off to prevent further discharge of the battery. The battery can no longer provide power.

At the Battery Internal Reconnect threshold, charge voltage must be applied to the pack to recover or to turn the internal protection FETs back on following a Battery Internal Disconnect. This is the voltage required before the internal protection circuitry of the battery allows power to come in or go out of the battery.

If the battery is overcharged, its cell voltage will continue to increase above 4.2 VDC. The internal protection circuit monitors the cell voltage and if it gets too high and the Battery Overcharge Disconnect threshold is exceeded, the internal FETs are turned off to prevent further overcharging (a potentially dangerous situation). The battery has a maximum charged voltage (CHARGED BATTERY VOLTAGE). If this voltage is exceeded, the life of the cell will be reduced.

The BATT_OFF signal is generated when the power from the battery drops below 2.5 VDC. This signal is used to force load dump of all parts of the system that can have power removed quickly in an attempt to get to SLEEP mode as quickly as possible. This signal should not occur unless the battery internally disconnects or if it is removed during operation (which is not advised). The second use of this signal is to turn off an FET to isolate VCC_2.5VDC (Super Cap voltage) from the input power to prevent leakage of power backwards.

The ONCHARGE signal is used to inform the system that it is on external power. In the event that the unit that has been forced into SLEEP from a low battery, the system can wake up and properly monitor the current state of the terminal. VCC_5VIN will be on when external power is available, this power is used to operate the terminal and charge the battery.

The Model 700 contains numerous internal connectors. These connections allow for maximum flexibility in the configuration of the system. The external connectors provide docking access as well as some tethered options. Depending upon the radio configurations, various portable antenna connections will be provided off the back of the unit at the top.

The external connectors consist of a two pin external power connector—AC wall adapter input, a three pin audio headset jack (3.5 mm), a sixteen pin connector for dock interconnection signals, and an external antenna. All signals that enter or exit the terminal are ESD and EMI protected to prevent damage to the terminal and to meet agency requirements.

The wall charger jack is a barrel jack. Its input range is 8–28 VDC (typically 12–15 VDC). The center pin is positive voltage and the outside barrel is ground.

The headset audio jack accepts the standard 3.5 mm three ring phone jack that comes with a Jabra-type headset. The innermost contact is the microphone, the center contact is the headset speaker and the very outside ring is ground (return for both microphone and headset speaker).

The terminal has a sixteen pin connector pin and 3.3 VDC is brought out to power peripherals.

| Pin No. | Signal Name | I/O To Terminal | Description |
| --- | --- | --- | --- |
| 1 | TPETXP | O | Ethernet TXP |
| 2 | TPETXN | O | Ethernet TXN (no transformer) |
| 3 | TPERXP | I | Ethernet RXP (no transformer) |
| 4 | TPERXN | I | Ethernet RXN (no transformer) |
| 5 | PWR_OUT | O | 3.3 VDC 0.5 A to power external modem |
| 6 | GROUND | I/O | Ground |
| 7 | GROUND | I/O | Ground |
| 8 | -RXD_OUT | I | RS-232 RXD (input to appliance) |
| 9 | CTS_OUT | I | RS-232 CTS (input to appliance) |
| 10 | DSR_OUT | I | RS-232 DSR (input to appliance) |
| 11 | RI_OUT | I | RS-232 RI (input to appliance) |
| 12 | DCD_OUT | O | RS-232 DCD (input to appliance) |
| 13 | DTR_OUT | O | RS-232 DTR (output from appliance) |
| 14 | RTS_OUT | O | RS-232 RTS (output from appliance) |
| 15 | -TXD_OUT | O | RS-232 TXD (output from appliance) |
| 16 | CHARGE_IN | I | Charging power (10 to 30 VDC, 1.5 Amp) |

The following temperatures represent the terminal operating environment. Internal temperatures will run higher during operation.

| Test | Range | Comments |
| --- | --- | --- |
| Storage: | −20 C. to 60 C. | Prolonged storage above 40 C. causes permanent loss of capacity |
| Recommended Operating: | 0 C. to 40 C. | offers optimal life |
| Extreme Operating: | −20 C. to 60 C. | May reduce battery run time |
| Battery Charging: | 0 to 50 C. | Li Ion pack internal temperature inside terminal |

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention. The forms herein described are merely representative embodiments thereof.

What is claimed is:

1. A battery system, comprising:
  an upper limit battery system temperature sensor;
  a lower limit battery system temperature sensor;
  a rechargeable energy storage component; and
  a temperature indication output component, coupled with said upper limit battery system temperature sensor and with said lower limit battery system temperature sensor;
  wherein said upper limit battery system temperature sensor determines whether the battery system's temperature is greater than a maximum temperature, said lower limit battery system temperature sensor determines whether the battery system's temperature is less than a minimum temperature, and wherein said temperature indication output component signals whether the battery system's temperature is between the maximum temperature and the minimum temperature.

2. The battery system of claim 1, further comprising a removable housing, said removable housing containing said upper limit battery system temperature sensor, said lower limit battery system temperature sensor and said rechargeable energy storage component.

3. The battery system of claim 1, wherein said upper limit battery system temperature sensor comprises a temperature sensing diode.

4. The battery system of claim 1, wherein said lower limit battery system temperature sensor comprises a temperature sensing diode.

5. The battery system of claim 1, wherein said upper limit battery system temperature sensor is designed to detect whether the battery system's temperature exceeds a temperature approximately equivalent to fifty degrees Celsius.

6. The battery system of claim 1, wherein said lower limit battery system temperature sensor is designed to detect whether the battery system's temperature is less than a temperature approximately equivalent to zero degrees Celsius.

7. The battery system of claim 1, wherein said rechargeable energy storage component comprises a lithium-ion energy cell.

8. The battery system of claim 1, further comprising an energy component protection circuit.

9. The battery system of claim 1, wherein said upper limit battery system temperature sensor comprises a thermistor.

10. The battery system of claim 1, wherein said lower limit battery system temperature sensor comprises a thermistor.

11. The battery system of claim 1, further comprising a switch coupled between said rechargeable energy storage component and said upper and lower limit battery system temperature sensors.

12. The battery system of claim 1, further comprising a power input line coupling a power source of a coupled battery powered device to said upper and lower limit battery system temperature sensors so as to provide operating power to said upper and lower limit battery system temperature sensors.

13. The battery system of claim 1, wherein said temperature indication output component comprises only a single output line, coupled to said upper limit battery system temperature sensor and to said lower limit battery system temperature sensor, to signal whether the battery system's temperature is between the maximum temperature and the minimum temperature.

14. The battery system of claim 1, further comprising a power connector component to transfer energy to and from said rechargeable energy storage component.

15. The battery system of claim 1, further comprising a computerized data collection device coupled with the battery system, said computerized data collection device being capable of recharging said rechargeable energy storage component.

16. The battery system of claim 15, wherein said computerized data collection device is further capable of providing operating power to said upper limit battery system temperature sensor and to said lower limit battery system temperature sensor.

17. The battery system of claim 15, wherein said computerized data collection device is further capable of providing charging power to the rechargeable energy storage component only when said temperature indication output component indicates that the battery system's temperature is between the maximum temperature and the minimum temperature.

* * * * *